(12) United States Patent
Okada

(10) Patent No.: US 8,629,406 B2
(45) Date of Patent: Jan. 14, 2014

(54) RADIATION DETECTION ELEMENT AND RADIOGRAPHIC IMAGING APPARATUS

(71) Applicant: FUJIFILM Corporation, Tokyo (JP)

(72) Inventor: Yoshihiro Okada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/958,886

(22) Filed: Aug. 5, 2013

(65) Prior Publication Data

US 2013/0313439 A1 Nov. 28, 2013

Related U.S. Application Data

(62) Division of application No. 13/172,524, filed on Jun. 29, 2011, now Pat. No. 8,507,871.

(30) Foreign Application Priority Data

| Jun. 30, 2010 | (JP) | 2010-150210 |
| Aug. 31, 2010 | (JP) | 2010-195204 |
| Apr. 4, 2011 | (JP) | 2011-083182 |

(51) Int. Cl.
*G01T 1/24* (2006.01)

(52) U.S. Cl.
USPC ................ 250/370.08; 250/370.09

(58) Field of Classification Search
USPC .......... 250/370.01, 370.08, 370.09; 378/98.8
See application file for complete search history.

(56) References Cited

U.S. PATENT DOCUMENTS

| 5,818,898 A | 10/1998 | Tsukamoto et al. |
| 2002/0101527 A1 | 8/2002 | Endo |
| 2007/0125952 A1 | 6/2007 | Endo et al. |

FOREIGN PATENT DOCUMENTS

| EP | 1277662 A2 | 7/2002 |
| JP | 2002181942 A | 6/2002 |
| JP | 2007151761 A | 6/2007 |

OTHER PUBLICATIONS

Communication, dated Sep. 27, 2011, issued in corresponding EP Application No. 11171917.5, 5 pages.
Invitation pursuant to Article 94(3) and Rule 71(1) EPC, dated May 14, 2013, issued in corresponding EP Application No. 11171917.5, 3 pages.

*Primary Examiner* — Mark R Gaworecki
(74) *Attorney, Agent, or Firm* — Sughrue Mion, PLLC

(57) ABSTRACT

The present invention provides a radiation detecting element and a radiographic imaging device that may reliably detect irradiation of radiation even when a region where radiation is irradiated is set narrowly. Namely, the present invention provides a radiation detection element and a radiographic imaging apparatus, in which radiographic imaging pixels and radiation detection pixels are provided at intersecting portions of scan lines and signal lines.

21 Claims, 25 Drawing Sheets

RADIATION DETECTION ELEMENT AND RADIOGRAPHIC IMAGING APPARATUS

CROSS-REFERENCE TO RELATED APPLICATION

This application is a divisional of U.S. application Ser. No. 13/172,524, filed Jun. 29, 2011, which claims priority to Japanese Patent Application Nos. 2010-150210, filed on Jun. 30, 2010, 2010-195204, filed on Aug. 31, 2010, and 2011-083182, filed on Apr. 4, 2011 each of which is incorporated herein by reference in its entirety.

BACKGROUND OF THE PRESENT INVENTION

1. Field of the Present Invention

The present invention relates to a radiation detecting element and a radiographic imaging device. The present invention particularly relates to a radiation detecting element with plural pixels arrayed in a matrix, in which charges generated due to irradiation of radiation are accumulated, and the amount of accumulated charges are detected as image information, and to a radiographic imaging device that uses the radiation detecting element for imaging a radiographic image.

2. Description of the Related Art

In recent years, radiographic imaging devices using a radiation detecting element such as a flat panel detector (FPD) that includes a radiation-sensitive layer placed on a thin-film transistor (TFT) active matrix substrate and can convert radiation such as X-rays directly into digital data, have been put to practical use. FPDs have advantages in that, compared to conventional imaging plates, images can be checked instantaneously and moving images can also be checked, and the spread of FPDs is rapidly progressing.

Various types are proposed for such radiation detecting element. There are, for example, direct-conversion-type radiographic imaging devices that convert radiation directly to charges in a semiconductor layer, and accumulate the charges. There are also indirect-conversion-type radiographic imaging devices that first convert radiation into light with a scintillator, such as CsI:T1, GOS (Gd2O2S:Tb) or the like, then convert the converted light into charges in a semiconductor layer and accumulate the charge.

In radiation detecting elements, charges are generated by dark current or the like, even when the pixels are not being irradiated by radiation, and the charges are accumulated in the pixels. Accordingly, in the radiographic imaging devices using the radiation detecting elements, during standby, a reset operation that extracts and removes the charges that have been accumulated in the pixels are repeatedly performed. Further, in the radiographic imaging devices using the radiation detecting elements, at the time of imaging, the reset operation are stopped, and the charges are accumulated during the irradiation period in which the pixels are irradiated by radiation. Furthermore, after the end of the irradiation period, the radiographic imaging devices using the radiation detecting elements perform read-out of the charges that have been accumulated in the pixels of the radiation detecting element.

As technologies that synchronize the timing of irradiation of radiation and the timing of the start of charge accumulation by the radiation detecting element, Japanese Patent Application Laid-Open (JP-A) No. 2002-181942 and JP-A No. 2007-151761, discloses a sensor capable of detecting radiation placed separately outside an imaging region of the radiation detecting element. In these technologies, accumulation of the charges is started by the radiation detecting element when radiation has been detected by the sensor.

Here, in radiographic imaging, the region where the radiation is irradiated is set as narrowly as possible, in order to prevent unnecessary exposure of examinees and radiologic technologists to radiation. That is, the region irradiated with radiation is set such that only the portion to be imaged is irradiated by radiation.

Accordingly, in the technologies described in JP-A No. 2002-181942 and JP-A No. 2007-151761, since the region irradiated with radiation has been narrowly set, there are cases where irradiation of radiation cannot be detected with the sensor.

SUMMARY OF THE PRESENT INVENTION

The present invention provides a radiation detecting element and a radiographic imaging device that may reliably detect radiation even when the region irradiated by radiation has been narrowly set.

A first aspect of the present invention is a radiation detection element including: a plurality of scan lines that are provided in parallel to each other; a plurality of signal lines that are provided in parallel to each other, and that intersect with the scan lines; and a plurality of pixels that are provided at intersecting portions of the scan lines and the signal lines, the plurality of pixels including, a plurality of radiographic imaging pixels each including, a sensor section that generates charges based on irradiation of radiation or on illumination of light that has been converted from radiation, and a switching element that is turned ON and OFF according to a state of a control signal flowing in the scan line, wherein the sensor section is electrically connected to the signal line through the switching element, and an electric signals corresponding to the charges generated in the sensor section flows in the signal line according to the state of the control signal, and a plurality of radiation detection pixels each including the sensor section that is electrically connected to the signal line, wherein an electric signals corresponding to the charges generated in the sensor section flows in the signal line irrespective of the state of the control signal.

According to the first aspect of the present invention, the radiographic imaging pixels and the radiation detection pixels are provided at an intersecting portion of the scan line and the signal line, which allows reliable detection of irradiated radiation, even when the region irradiated by radiation has been narrowly set.

According to a second aspect of the present invention, in the first aspect, the radiation detection pixel may further include: a connection line that connects the sensor section and the signal line; and a switching element that is substantially identical to the switching element included in the radiographic imaging pixel, wherein the sensor section may be electrically connected to the signal line through the switching element of the radiation detection pixel.

According to a third aspect of the present invention, in the second aspect, the switching element of the radiation detection pixel may be electrically separated from the sensor section.

According to a fourth aspect of the present invention, in the first aspect, the radiation detection pixel may further include a short-circuited switching element, wherein the sensor section may be electrically connected to the signal line through the short-circuited switching element.

According to a fifth aspect of the present invention, in the above aspects, wherein the plurality of radiation detection pixels may be provided at intervals of at least one pixel, and are provided at only some signal lines out of the plurality of signal lines.

A sixth aspect of the present invention is a radiographic imaging apparatus including: the radiation detection element according to the above aspects; a control signal output section that outputs the control signal to the plurality of scan lines; an AD conversion section that converts the electric signals flowing in the plurality of signal lines to digital data; a generation section that generates image information expressing a radiation image based on the digital data by interpolating the image information of the radiation detection pixels; and a detection section that detects, at least one of a start of irradiation of radiation, an end of irradiation of radiation, and an amount of irradiated radiation, on the basis of the digital data that has been converted by the AD conversion section from the electric signals that flow in the signal lines out from the radiation detection pixels.

Therefore, the sixth aspect of the present invention acts similarly to the first aspect of the present invention, which allows reliable detection of irradiated radiation, even when the region irradiated by radiation has been narrowly set.

According to a seventh aspect of the present invention, in the sixth aspect, the detection section may detect the start of irradiation of radiation, and the detection section may further include: a control section which, during standby, controls the control signal output section so as to repeatedly perform a reset operation, which outputs control signals for reading out the charges to the plurality of scan lines to extract the charges from the radiographic imaging pixels, and, at the time of imaging a radiographic image, when the start of irradiation of radiation has been detected by the detection section, controls the control signal output section to output control signals that prohibit extraction of the charges to the plurality of scan lines and, after the end of irradiation of radiation, output control signals that perform extraction of the charges to the plurality of scan lines.

According to an eighth aspect of the present invention, in the seventh aspect, the control section may control the control signal output section to repeatedly perform the reset operation until the start of irradiation of radiation is detected by the detection section at the time of imaging a radiographic image.

According to a ninth aspect of the present invention, in the seventh aspect, the control section may control the control signal output section to output control signals that prohibit extraction of the charges with respect to the plurality of scan lines, until the detection section detects the start of irradiation of radiation, at the time of imaging the radiation image.

According to a tenth aspect of the present invention, in the above aspects, the control signal output section may output control signals for extracting the charges sequentially to the plurality of scan lines, or at once to all of the plurality of scan lines, during the reset operation.

According to an eleventh aspect of the present invention, in the above aspects, the AD conversion section may convert the electric signals flowing in the signal lines into the digital data within a period shorter than a radiation irradiation period for imaging the radiation image, and the detection section may detect, at least one of the start of irradiation of radiation, the end of irradiation of radiation, and the amount of irradiated radiation, within the period.

According to a twelfth aspect of the present invention, in the above aspects, the AD conversion section may convert, into the digital data, the electric signals flowing in one of the signal lines connected to the radiation detection pixels, and the electric signals flowing in the signal lines that are not connected to the radiation detection pixels or in the signal lines connected to a smaller number of radiation detection pixels than the one of the signal lines, and the detection section may perform the detection based on a difference between a value of the digital data of the one of the signal lines connected to the radiation detection pixels, and a value of the digital data of the signal lines that are not connected to the radiation detection pixels or of the signal lines connected to a smaller number of radiation detection pixels than the one of the signal lines.

According to a thirteenth aspect of the present invention, in the twelfth aspect, a plurality of the AD conversion sections may be provided, each connected to a predetermined number of the plurality of signal lines, and the detection section may perform the detection based on a difference between the value of the digital data of the one of the signal line connected to the radiation detection pixel, and the value of the digital data of the signal lines that are not connected to the radiation detection pixels or of the signal lines connected to a smaller number of radiation detection pixels than the one of the signal lines, said values being the values of digital data into which the electric signals are converted by the same AD conversion section.

According to a fourteenth aspect of the present invention, in the above aspects, the detection section may perform the detection based on a difference between a value of the digital data of the signal line connected to one of the radiation detection pixels, and a value of the digital data of the signal line that is adjacent to the signal line connected to the one of the radiation detection pixels and not connected to the radiation detection pixel or connected to a smaller number of radiation detection pixels than the one of the signal lines.

A fifteenth aspect of the present invention is a radiographic imaging apparatus including: the radiation detection element according to the above aspects; a control signal output section that outputs the control signal to the plurality of scan lines; an amplifier section that accumulates the electric signals flowing in the plurality of signal lines, and that amplifies and outputs the accumulated electric signals; a detection section that detects at least one of a start of irradiation of radiation, an end of irradiation of radiation, and an amount of irradiated radiation, on the basis of the electric signals output from the amplifier section; and a control section that controls the control signal output section so as to repeatedly perform a reset operation in a predetermined period, which sequentially outputs a control signal for extracting the charges to the plurality of scan lines to extract the charges from the plurality of pixels.

According to a sixteenth aspect of the present invention, in the fifteenth aspect, wherein, in the predetermined period, the control section may control the control signal output section to output the control signal for extracting the charges from the radiographic imaging pixels to the scan lines that are not connected to the radiation detection pixels, in order to supply the control signal to the radiation detection pixels.

According to a seventeenth aspect of the present invention, in the above aspects, the control section may control the control signal output section to output the control signal for extracting the charges from the radiation detection pixels, to the scan lines outside of the predetermined period.

According to an eighteenth aspect of the present invention, in the above aspects, wherein, in each of the predetermined period, the amplifier section may accumulate the electric signals flowing in one of the signal lines connected to the radiation detection pixels, and the electric signals flowing in the signal lines that are not connected to the radiation detection pixels or in the signal line connected to a smaller number of radiation detection pixels than the one of the signal lines, and may amplify and output the electric signals, and wherein the detection section may perform the detection based on a difference between the value of the electric signals, outputted from the amplifier section, of the one of the signal line connected to the radiation detection pixels, and the value of the electric signals, outputted from the amplifier section, of the signal lines that are not connected to the radiation detection pixels or that are connected to a smaller number of radiation detection pixels than the one of the signal lines.

According to the above aspects of the present invention, the present invention may reliably detect radiation even when the region irradiated by radiation has been narrowly set.

BRIEF DESCRIPTION OF THE DRAWINGS

Exemplary embodiment of the present invention will be described in detail based on the following figures, wherein.

DETAILED DESCRIPTION OF THE PRESENT INVENTION

Hereinafter, exemplary embodiments of the present invention will be described below with reference to the drawings.

In the present exemplary embodiment, a case where the present invention is applied to an indirect-conversion-type radiation detecting element 10 that first converts radiation such as X-rays into light, and then converts that light into charges, will be described.

First Exemplary Embodiment

Figure 1:
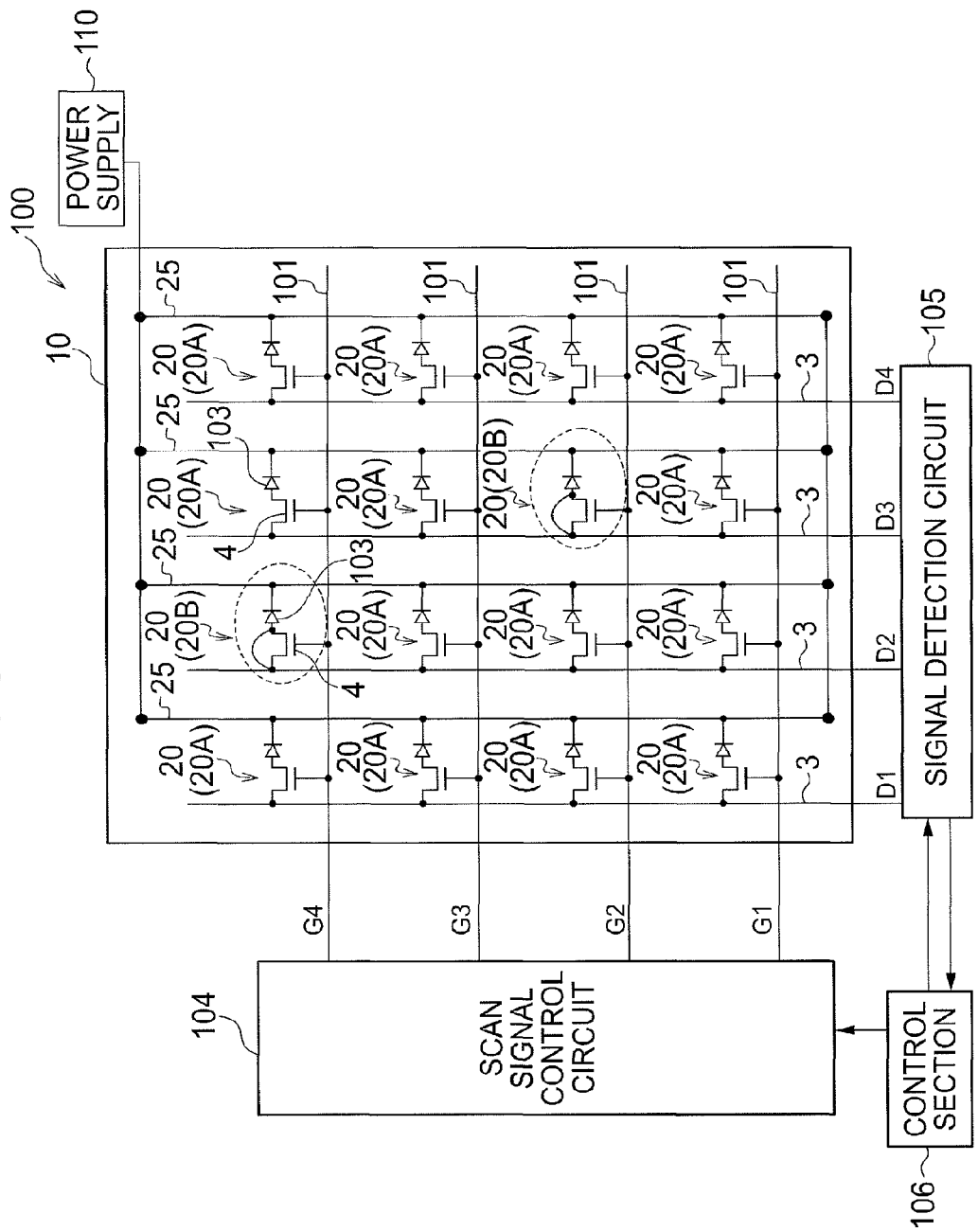
FIG. 1 is a configuration diagram illustrating an entire configuration of a radiographic imaging apparatus according to a first exemplary embodiment of the present invention.

FIG. 1 shows an entire configuration of a radiographic imaging apparatus 100 in which a radiation detection element 10 according to a first exemplary embodiment of the present invention is used.

As shown in FIG. 1, the radiographic imaging device 100 according to the present exemplary embodiment is equipped with the indirect-conversion-type radiation detecting element 10. A scintillator that converts the radiation into light is omitted.

Plural pixels 20 are placed in the radiation detecting element 10. Each of the pixels 20 is configured to include a sensor section 103 and a TFT switch 4. The sensor section 103 receives light, generates charges, and accumulates the generated charges. The TFT switch 4 is for reading out the charges that has been accumulated in the sensor section 103. In the present exemplary embodiment, the sensor sections 103 generate the charges as a result of being illuminated by the light into which the radiation has been converted by the scintillator. The TFT switches 4 correspond to switch elements of the present invention.

Figure 6:
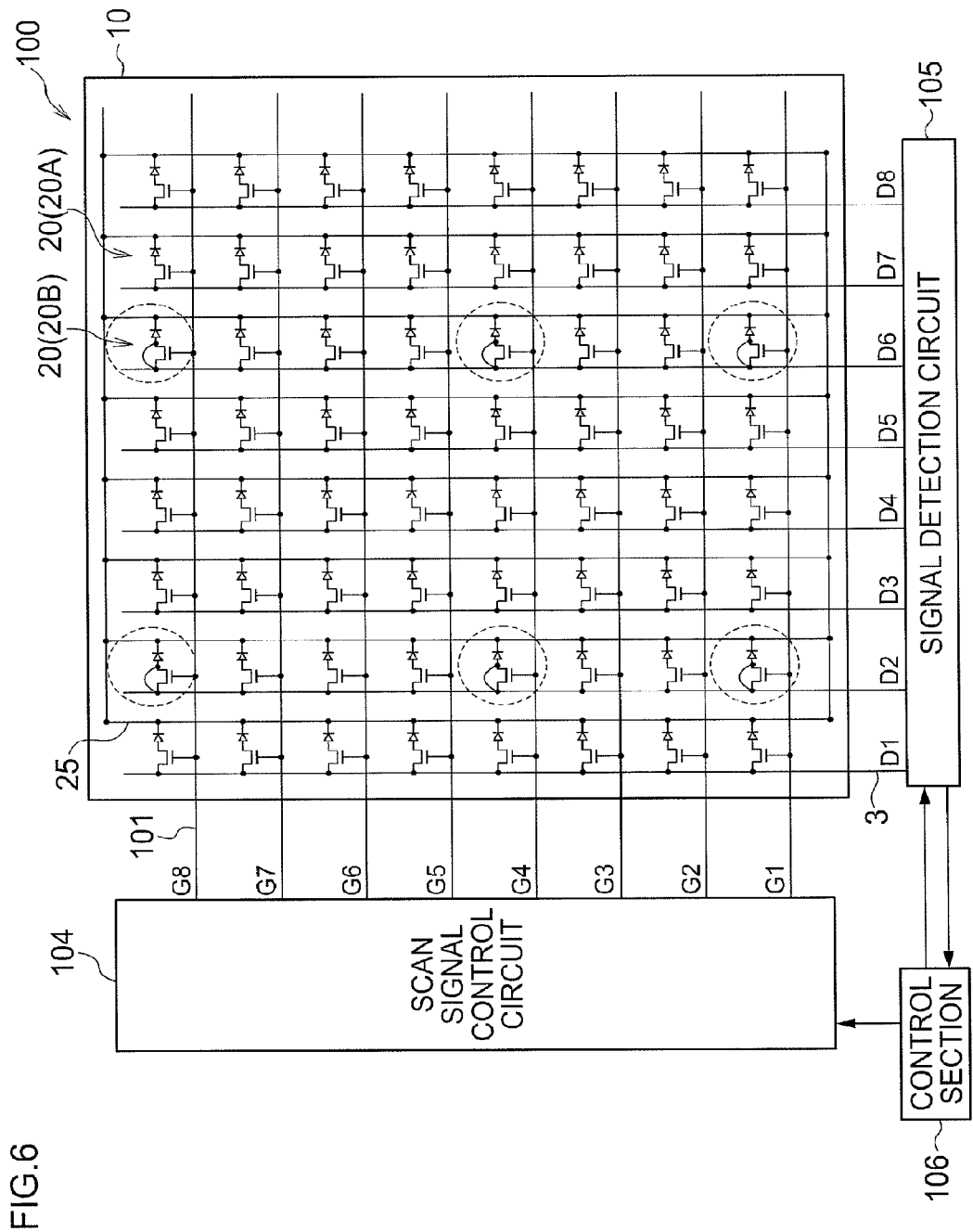
FIG. 6 is a configuration diagram illustrating a radiographic imaging pixel of the radiographic imaging element of the first exemplary embodiment, and an arrangement of the radiographic imaging pixels.

The pixels 20 are plurally placed in a matrix in one direction (the horizontal direction in FIG. 1; hereinafter called a "row direction" below) and in an intersecting direction (the vertical direction in FIG. 1; hereinafter called a "column direction" below) with respect to that row direction. In FIG. 1 and FIG. 6, the pixel 20 array is depicted in a simplified way; however, there are, for example, 1024×1024 of the pixels 20 placed in the one direction and in the intersecting direction.

In the present exemplary embodiment, among the plural pixels 20, pixels 20A for radiographic imaging (radiographic imaging pixels) and pixels 20B for radiation detection (radiation detection pixels) are employed. In FIG. 1 and FIG. 6, the radiation detection pixels 20B are encircled by dashed lines. The radiographic imaging pixels 20A are used to detect the radiation and to create an image represented by the radiation. The radiation detection pixels 20B are used to detect the start of irradiation of the radiation.

Figure 3:
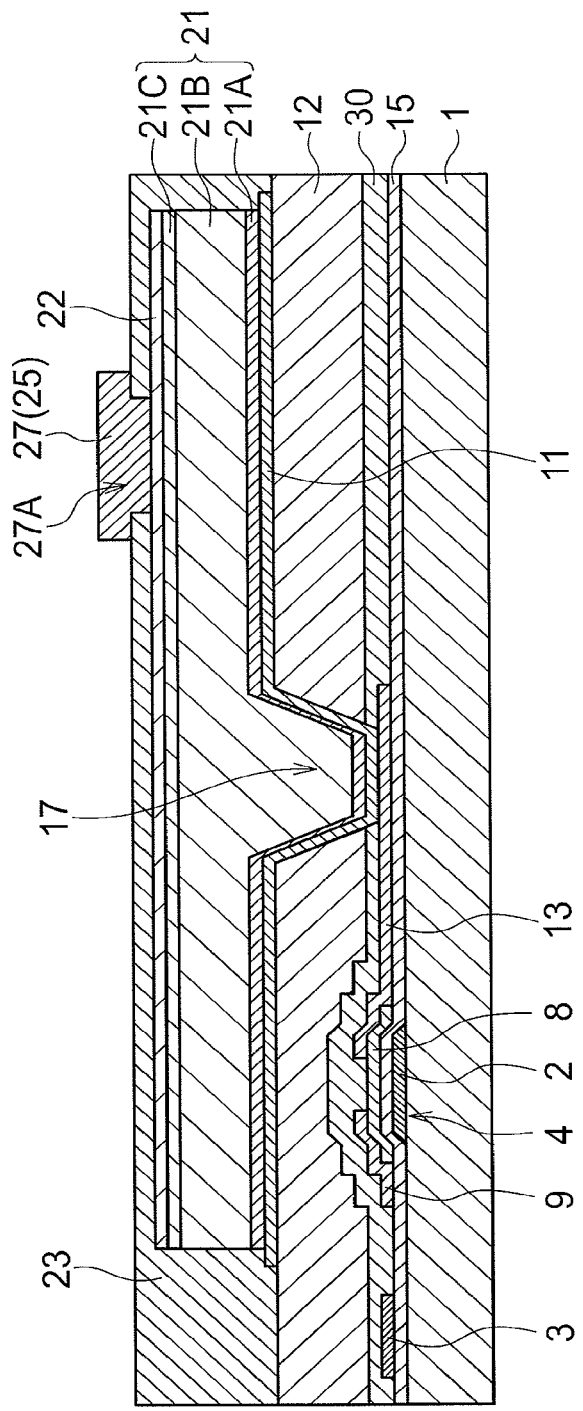
FIG. 3 is a sectional view taken along line A-A in the radiation detection element of the first exemplary embodiment.

Further, in the radiation detecting element 10, plural first scan lines 101 for switching the TFT switches 4 ON and OFF, and plural signal lines 3 for reading out the charges that have been accumulated in the sensor sections 103, are disposed intersecting each other on a substrate 1 (see FIG. 3). In the present exemplary embodiment, the signal lines 3 are disposed such that there is one each for each pixel row in the one direction, and the scan lines 101 are disposed such that there is one each for each pixel row in the intersecting direction. For example, in a case where there are 1024×1024 of the pixels 20 placed in the one direction and in the intersecting direction, the signal lines 3 and the scan lines 101 are disposed such that there are 1024 of each.

Moreover, in the radiation detecting element 10, common electrode lines 25 are disposed in parallel to each of the signal lines 3. One ends and the other ends of the common electrode lines 25 are connected in parallel, and the one ends of the common electrode lines 25 are connected to a power source 110 that supplies a predetermined bias voltage. The sensor sections 103 are connected to the common electrode lines 25, and the bias voltage is applied to the sensor sections 103 via the common electrode lines 25.

A control signal flows in the scan lines 101 to switch each TFT switches 4. The control signal flows in each scan line 101 to perform the switching of each TFT switches 4.

In accordance with the switching state of the TFT switches 4 of the pixels 20, electric signals corresponding to the charges that have been accumulated in the pixels 20 flow in the signal lines 3. More specifically, electric signal corresponding to the charge quantity that have been accumulated as a result of any of the TFT switches 4 of the pixels 20 connected to those signal lines 3 being switched ON flow in the signal lines 3.

A signal detection circuit 105 that detects the electric signals flowing out in the signal lines 3, is connected to the signal lines 3. Further, a scan signal control circuit 104 that outputs the control signals for switching the TFT switches 4 ON and OFF to the scan lines 101 is connected to the scan lines 101. Although one signal detection circuit 105 and one the scan signal control circuit 104 are shown in FIGS. 1 and 6, for example, plural signal detection circuits 105 and plural scan signal control circuits 104 may be provided, and in each signal detection circuit 105 and scan signal control circuit 104, predetermined numbers (for example, every 256 lines) of signal lines 3 or the scan lines 101 may be connected. For example, when the 1024 signal lines 3 and the 1024 scan lines 101 are provided, 4 scan signal control circuits 104 may be provided, each connected to 256 scan lines 101, and 4 signal detection circuits 105 may be provided, each connected to 256 signal lines 3.

The signal detection circuit 105 includes, per each of the signal lines 3, built-in amplifier circuits that amplify the inputted electric signals. The signal detection circuit 105 amplifies, with the amplifier circuits, the electric signals inputted from the signal lines 3, and converts the amplified electric signals into digital data.

A control section 106 is connected to the signal detection circuit 105 and the scan signal control circuit 104. The control section 106 performs predetermined process, such as noise removal, with respect to the digital data into which the electric signals have been converted in the signal detection circuit 105, outputs control signals indicating signal detection timing with respect to the signal detection circuit 105, and outputs control signals indicating read-out timing with respect to the scan signal control circuit 104.

The control section 106 of the present exemplary embodiment is configured by a microcomputer and is equipped with a central processing unit (CPU), a ROM, a RAM, and a nonvolatile storage section such as a flash memory. The control section 106 performs, with respect to image information to which the above predetermined process has been administered, process (interpolation process) that interpolates the image information of the radiation detection pixels 20B to thereby create an image represented by the radiation with which the pixels have been irradiated. Namely, the control section 106 interpolates, on the basis of the image information to which the above predetermined process, the image information of the radiation detection pixels 20B to thereby create an image represented by the radiation with which the pixels have been irradiated.

Figure 2:
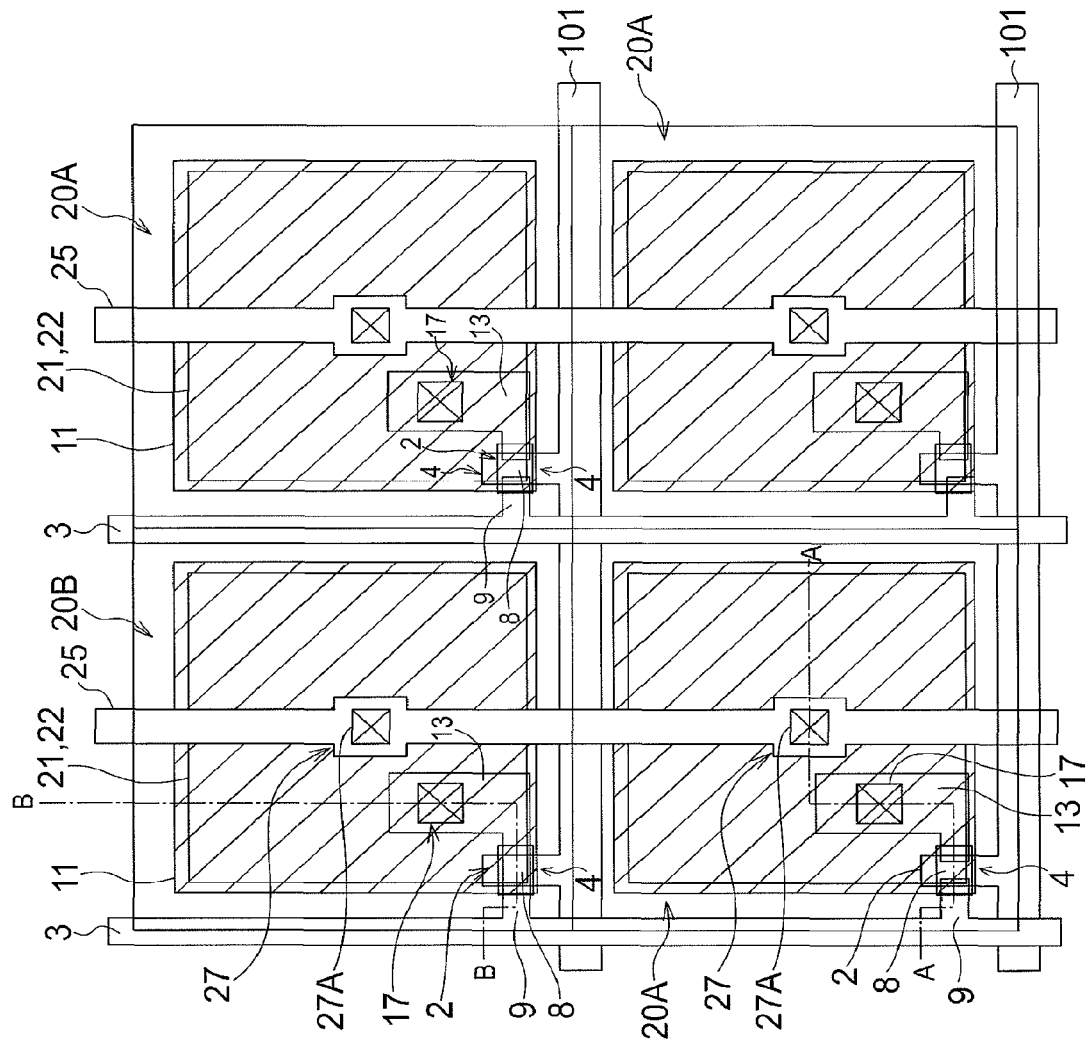
FIG. 2 is a plan view illustrating a configuration of a radiation detection element of the first exemplary embodiment.
Figure 4:
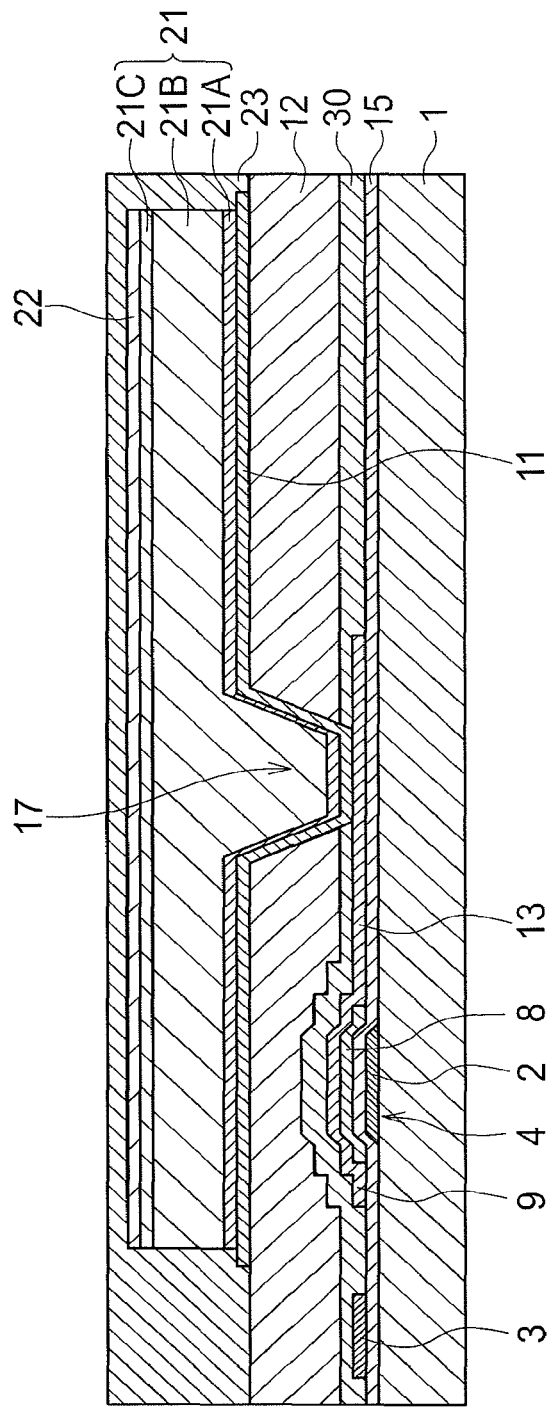
FIG. 4 is a sectional view taken along line B-B in the radiation detection element of the first exemplary embodiment.

FIG. 2 is a plan view illustrating a structure of the indirect conversion type of radiation detection element 10 of the first exemplary embodiment. FIG. 3 is a sectional view taken along line A-A of a radiographic imaging pixel 20A of FIG. 2. FIG. 4 is a sectional view taken along line B-B of a radiation detection pixel 20B of FIG. 2.

As shown in FIG. 3, in the radiographic imaging pixels 20A of the radiation detection element 10, the scan lines 101 (see FIG. 2) and a gate electrodes 2 are formed on the insulating substrate 1 including alkali-free glass or the like, and the scan lines 101 and the gate electrodes 2 are connected (see FIG. 2). The wiring layer in which the scan lines 101, and the gate electrodes 2 are formed (hereinafter called "first signal line layer") is formed from Al and/or Cu, or a layered film mainly composed of Al and/or Cu. However, the material of the wiring layer is not limited thereto.

On the first signal line layer, an insulating film 15 is formed on one surface, and the portion on top of the gate electrodes 2 acts as a gate insulating film in the TFT switches 4. The insulation film 15 is, for example, formed from SiNx or the like by, for example, Chemical Vapor Deposition (CVD) film forming.

An island shape of a semiconductor active layer 8 is formed above the insulation film 15 on each of the gate electrodes 2. The semiconductor active layer 8 is a channel portion of the TFT switch 4 and is, for example, formed from an amorphous silicon film.

A source electrode 9 and a drain electrode 13 are formed above the aforementioned layer. In the wiring layers in which the source electrodes 9 and the drain electrodes 13 are formed, the signal lines 3 are formed. The source electrodes 9 are connected to the signal lines 3 (see FIG. 2). The wiring layer in which the source electrodes 9, the drain electrodes 13, and the signal lines 3 are formed (hereinafter called "second signal line layer") is formed from Al and/or Cu, or a layered film mainly composed of Al and/or Cu. However, the material of the second signal wiring layer is not limited thereto. A contact layer (not shown in the drawings) is formed between the semiconductor active layer 8, and both the source electrode 9 and the drain electrode 13. The contact layer is an impurity doped semiconductor layer of, for example, impurity doped amorphous silicon or the like. Each of the TFT switches 4 is configured by the gate electrode 2, the semiconductor active layer 8, the source electrode 9, and the drain electrode 13. In the TFT switches 4, the source electrodes 9 and the drain electrodes 13 may be opposite because of the polarities of the charges collected and accumulated by lower electrodes 11.

Above the second signal line layer, a TFT protective film layer 30 is formed, in order to protect the TFT switches 4 and the signal lines 3, on substantially the entire surface (substantially the entire region) of the region in which the pixels 20 are disposed on the substrate 1. The TFT protective film layer 30 is formed, for example, from SiNx or the like, by, for example, CVD film forming.

A coated interlayer insulation film 12 is formed on the TFT protective film layer 30. The interlayer insulation film 12 is formed in a film thickness of 1 to 4 μm by a photosensitive organic material (e.g., a positive photosensitive acrylic resin: a material in which a naphthoquinone diazide positive photosensitizer is mixed together with a base polymer comprising a copolymer of methacrylic acid and glycidyl methacrylate) having a low permittivity (relative permittivity $\epsilon_r$=2 to 4).

In the radiation detecting element 10 according to the present exemplary embodiment, the capacitance between metals placed on top of and under the interlayer insulation film 12 is kept low by the interlayer insulation film 12. Further, interlayer insulation film 12 also has a function as a flattening film and flattens the steps of the layers there under. In the radiation detecting element 10 according to the present exemplary embodiment, contact holes 17 are formed at positions of the interlayer insulation film 12 and the TFT protective film layer 30 opposing the drain electrodes 13.

Lower electrodes 11 of the sensor sections 103 are formed on the interlayer insulation film 12 so as to cover the pixel regions while filling in the contact holes 17. The lower electrodes 11 are connected to the drain electrodes 13 of the TFT switches 4. When a semiconductor layer 21, described later, is about 1 μm thick, there is substantially no limitation to the material of the lower electrodes 18 as long as it is a conductive material. The lower electrodes 11 are therefore formed with a conductive metal, such as an aluminum based material, ITO or the like.

However, in cases in which the film thickness of the semiconductor layer 21 is thin (about 0.2 μm to 0.5 μm), light may not be sufficiently absorbed by the semiconductor layer 21, and measures need to be taken to prevent an increase in leak current flow due to light illumination onto the TFT switch 4. Consequently, in such cases the lower electrode 11 is preferably an alloy or layered film with a metal having light-blocking ability as a main component.

The semiconductor layer 21 is formed on the lower electrode 11 and functions as a photodiode. In the present exemplary embodiment, a photodiode of PIN structure is employed, in which an n+ layer, an i layer and a p+ layer (n+amorphous silicon, amorphous silicon, p+amorphous silicon) are layered on each other as the semiconductor layer 21. Consequently, in the semiconductor layer 21 of the present exemplary embodiment, an n+layer 21A, an i layer 21B and a p+layer 21C are formed, layered in this sequence from the bottom layer. The i layer 21B generates charges (pairs of free electrons and free holes) due to illumination of light. The n+layer 21A and the p+ layer 21C function as contact layers, and respectively electrically connect the lower electrode 11 and the upper electrode 22 with the i layer 21B. The i layer 21B corresponds to a photoelectric conversion layer of the present invention.

In the present exemplary embodiment, the lower electrodes 11 are formed with larger surface area than the semiconductor layer 21. Further, the light illumination side of the TFT switch 4 is covered by the semiconductor layer 21. Accordingly, in the present exemplary embodiment, the proportion of surface area within the pixel regions that can receive light (called the fill factor) is made larger, and light can be suppressed from being incident on the TFT switches 4.

Individual upper electrodes 22 are formed on each of the semiconductor layers 21. The upper electrodes 22 are, for example, formed using a material having high light transmissive, such as ITO, Indium Zinc Oxide (IZO) or the like. In the radiation detection element 10 according to the present exemplary embodiment, each of the sensor section 103 is configured including the upper electrode 22, the semiconductor layer 21, and the lower electrode 11.

To cover each of the semiconductor layers 21, a coated interlayer insulation film 23 is formed on the interlayer insulation film 12, the semiconductor layers 21, and the upper electrodes 22 so as to have openings 27A at a portion corresponding to the upper electrodes 22.

On the interlayer insulation film 23, the common electrode lines 25 are formed by Al and/or Cu, or a layered film mainly composed of Al and/or Cu. Contact pads 27 are formed neighboring the openings 27A, and the common electrode lines 25 are electrically connected to the upper electrodes 22 via the openings 27A in the interlayer insulation film 23.

On the other hand, as shown in FIG. 4, the TFT switches 4 are formed in the radiation detection pixels 20B of the radiation detection element 10 such that the source electrodes 9 and the drain electrodes 13 are in contact with each other. Namely, the source and the drain of the TFT switches 4 are short-circuited in the radiation detection pixels 20B. Therefore, in the radiation detection pixels 20B, the charges collected in the lower electrode 11 flows out to the signal lines 3 irrespective of the switching state of the TFT switches 4.

In the radiation detection element 10 configured as described above, as required, a protection layer may be formed from an insulating material with low light absorption characteristics, and a scintillator, configured, for example, from GOS or the like, is attached using an adhesive resin with low light absorption characteristics formed on the surface of the protection layer.

Figure 5:
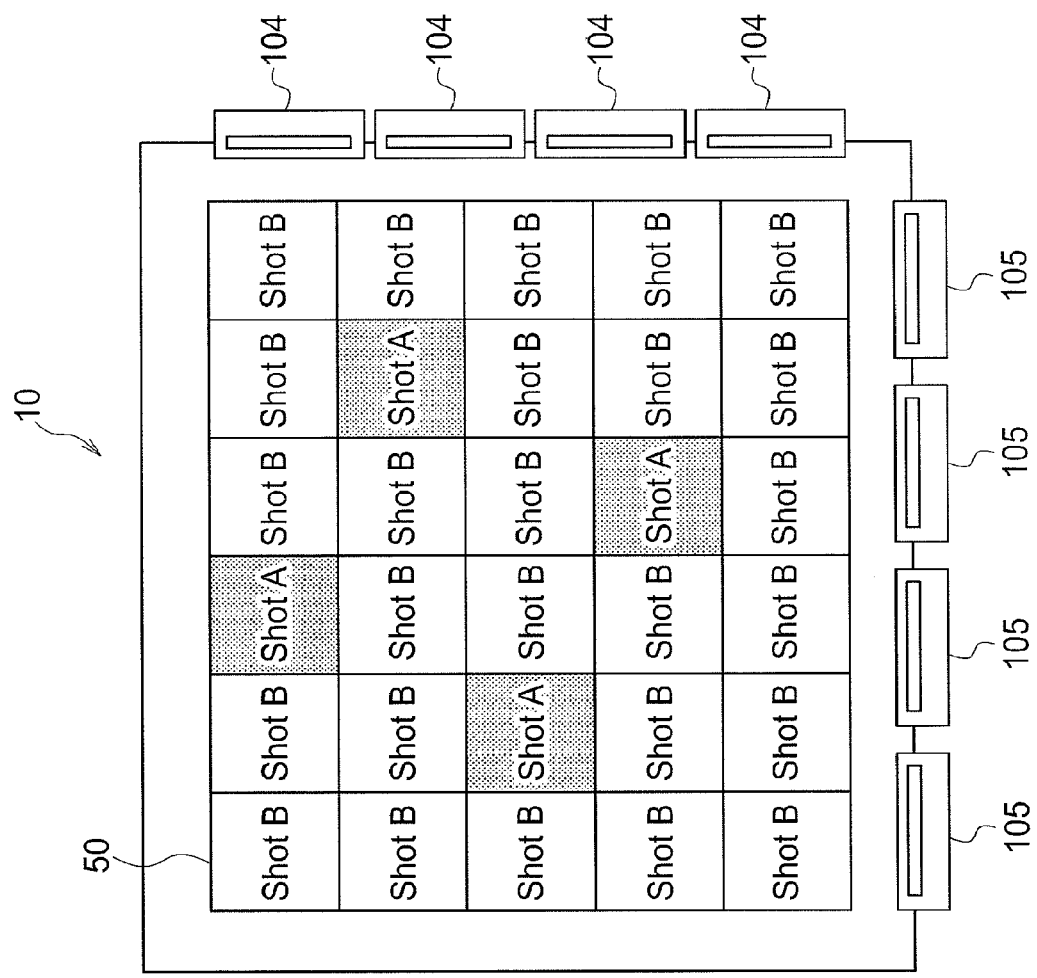
FIG. 5 shows a method for designing the radiation detection element of the first exemplary embodiment.

Next, an example of a method for forming the radiation detection pixels 20B will be described below. When an active area of the radiation detection element 10 is larger than a photomask, the active area 50 is divided as shown in FIG. 5, and exposure is performed for each divided area. In the example of FIG. 5, the active area 50 is divided into 5×6 shots. FIG. 5 illustrates the divided areas. In the first exemplary embodiment, the exposure is performed by using two kinds of photomasks when forming the second signal line layer of the radiation detection element 10. In area "shot A", the exposure is performed by using the photomask formed such that, in some pixels 20, the source electrode 9 and the drain electrode 13 come into contact with each other. Further, in area "shot B", the exposure is performed by using the photomask formed such that, in the pixels 20, the source electrode 9 and the drain electrode 13 are separated from each other. Note that, in the photomask for shot A, it is preferable for the pixels 20B to be formed at intervals equal to or greater than one pixel apart from each other such that the pixels 20B are not placed continuously. Because of this, the image quality of the image created by the interpolation process in the control section 106 becomes high compared to a case where the radiation detection pixels 20B are placed continuously.

Here, as shown in FIG. 6, it is preferable for the radiation detection pixels 20B to be formed in the radiation detecting element 10 such that they are plurally placed with respect to specific signal lines 3 (here, D2 and D6 signal lines 3). In FIG. 6, the radiation detecting element 10 is shown in a simplified manner, but in a case where there are 1024 of the signal lines 3 disposed, for example, eight of the signal lines 3 are selected every 128 lines, and sixteen of the pixels 20B are formed every other 64 pixels in the selected eight signal lines 3. In this case, the placement positions of the pixels 20B become uniform. Further, in this case, the number of the pixels 20B becomes 128, and in a case where there are 1024×1024 of the pixels 20, the pixels 20B occupy 0.01% of all of the pixels 20. The ratio of the radiation detection pixels 20B with respect to all of the pixels 20 is not limited thereto. Various ratios are conceivable, and this ratio can also be determined on the basis of the precision of the interpolation processing in the control section 106, and so forth. For example, in a case where the image quality of the image created by the interpolation process is high, the ratio of the radiation detection pixels 20B with respect to all of the pixels 20 may be about 1%, for example, or the percentage may be raised even more.

Figure 7:
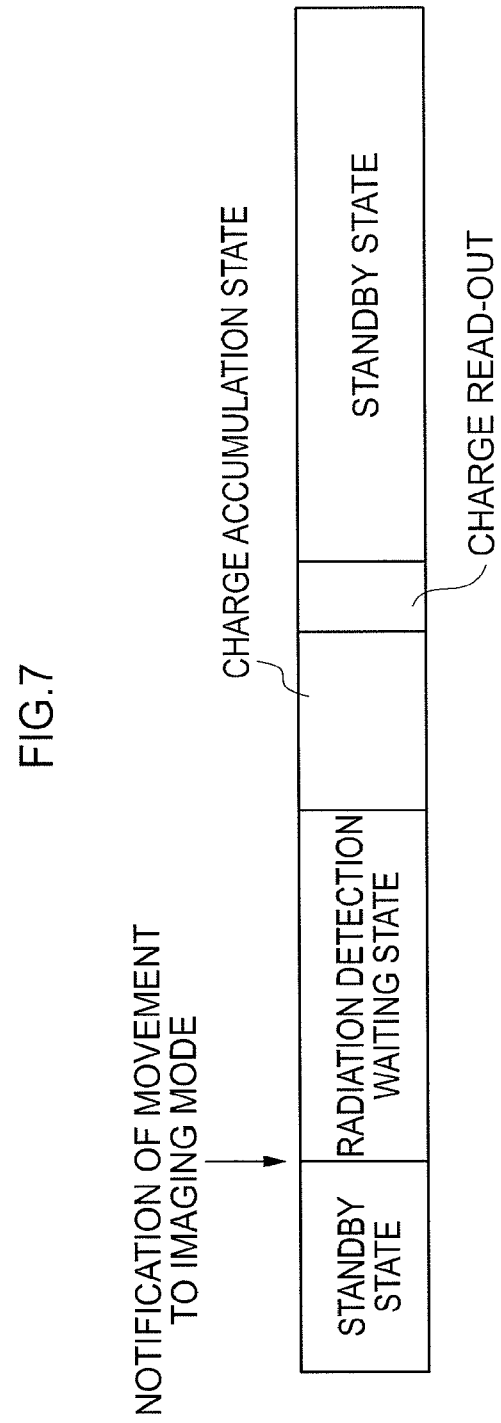
FIG. 7 is a schematic diagram illustrating an operation flow at the time of imaging a radiation image by the radiographic imaging apparatus of the first exemplary embodiment.

An operational flow at the time of imaging the radiation image by the radiographic imaging apparatus 100 of the first exemplary embodiment will be described below with reference to FIG. 7.

In the radiation detecting element 10, charges are generated by dark current or the like even when the radiation detecting element 10 is not being irradiated by radiation, and the charges are accumulated in the pixels 20. Accordingly, during the standby state, the radiographic imaging device 100 repeatedly performs a reset operation in which it extracts and removes the charges that have been accumulated in the pixels 20. The information resulting from the charges that have been read out by the reset operation is utilized in the correction of noise (offset) generated in radiographic images by dark current or the like.

The radiographic imaging device 100 is configured to start imaging a radiographic image by detecting the start of irradiation of radiation, and starting the accumulation of charges in the pixels 20 of the radiation detecting element 10. When radiographic imaging is to be performed, the radiographic imaging device 100 is notified of movement to an imaging mode.

When the radiographic imaging device 100 is notified of the movement to the imaging mode, it moves to a radiation detection waiting state in which it performs detection of radiation. When the radiographic imaging device 100 detects radiation, it moves to a charge accumulation state in which it accumulates charges in the radiation detecting element 10. After a predetermined period after detecting radiation, the radiographic imaging device 100 moves to a charges read-out state in which it reads out the charges that have been accumulated. After the end of the read-out of the charges, the radiographic imaging device 100 moves to the standby state.

Figure 8:
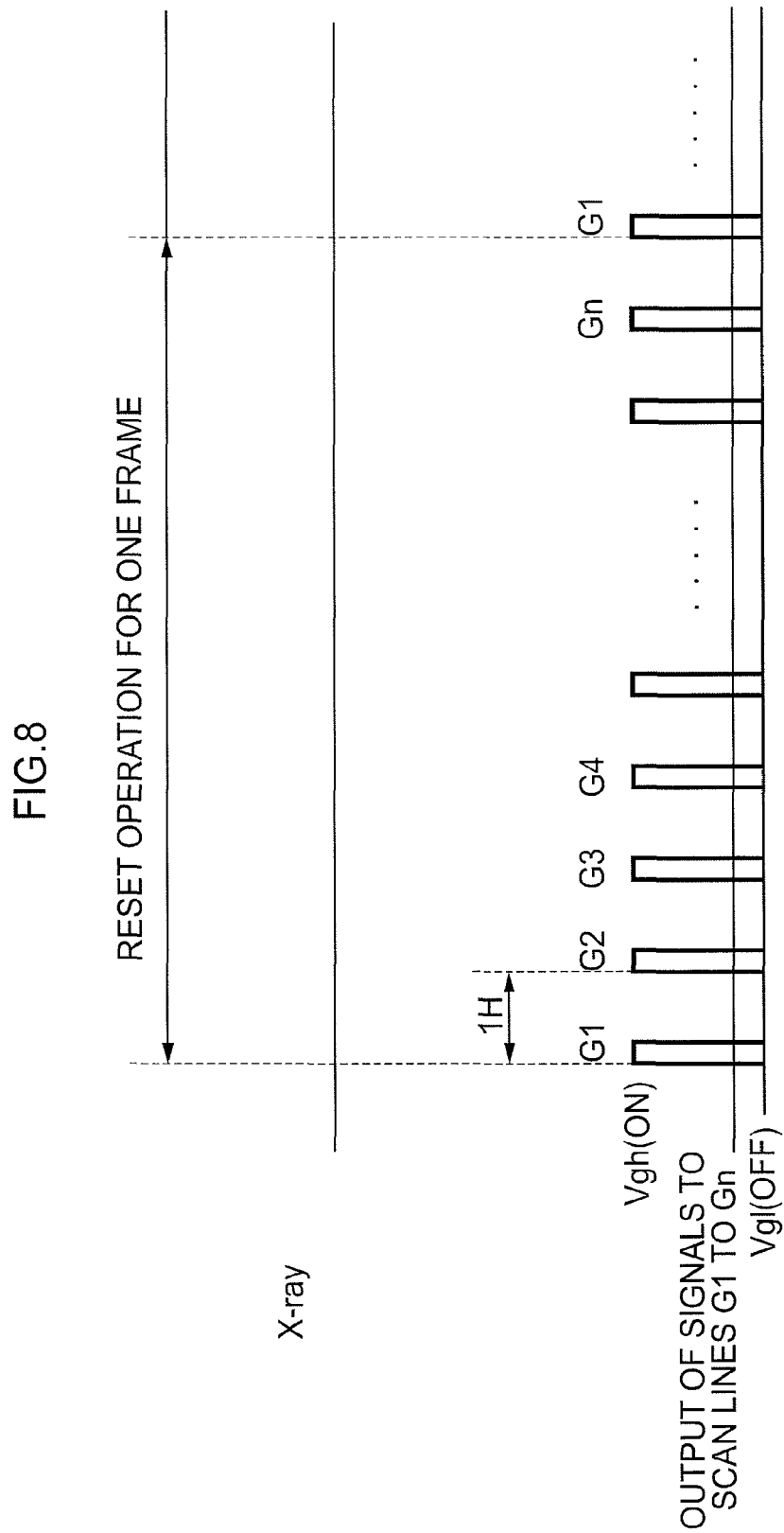
FIG. 8 is a timing chart illustrating a detailed operation flow in a standby state of the radiographic imaging apparatus of the first exemplary embodiment.
Figure 9:
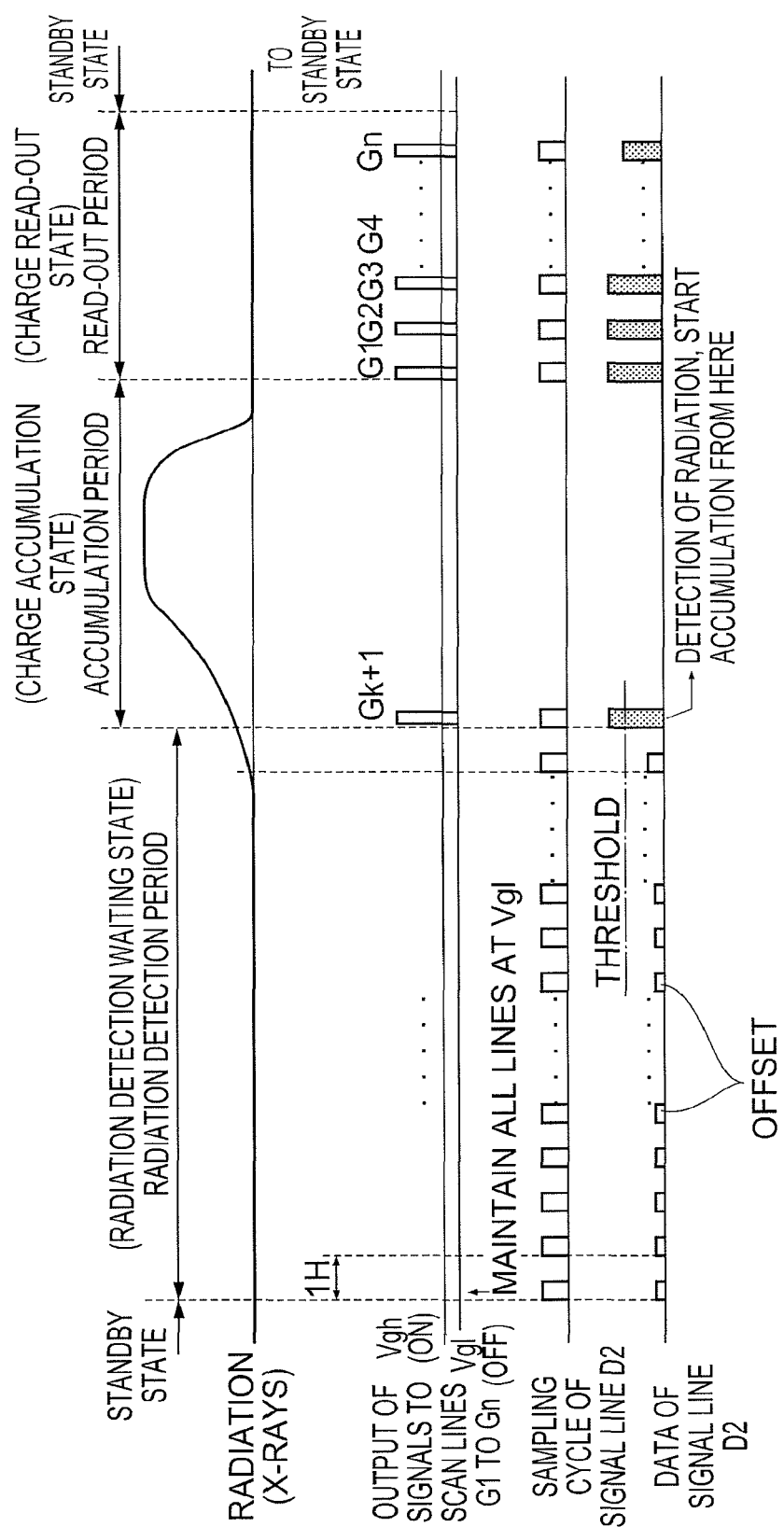
FIG. 9 is a timing chart illustrating the detailed operation flow when imaging a radiation image by the radiographic imaging apparatus of the first exemplary embodiment.

FIGS. 8 and 9 are timing charts illustrating the detailed operation flow at the time of imaging the radiation image by the radiographic imaging apparatus 100 of the first exemplary embodiment.

In the case of the standby state, the control section 106 controls the scan signal control circuit 104 so that, as shown in FIG. 8, the control section 106 causes ON signals (signals of electric potential VgH) to be outputted to the scan lines 101 sequentially one line at a time from the scan signal control circuit 104, switches on sequentially one line at a line the TFT switches 4 connected to the scan lines 101, and performs extraction of the charges. Due thereto, the charges that have been accumulated in the pixels 20 sequentially one line at a time flow out to the signal lines 3 as electric signals. After the elapse of a predetermined period while the action state is the standby state, the control section 106 repeats the reset operation in which it causes ON signals to be outputted to the scan lines 101 sequentially one line at a time, extracts the charges that have been accumulated in each of the pixels 20 of the radiation detecting element 10, and resets one frame's worth.

The control section 106 moves to the radiation detection waiting state when it is notified of the movement to the imaging mode. During the radiation detection waiting state, as shown in FIG. 9, the control section 106 controls the scan signal control circuit 104 to output an OFF signal (a signal having a potential Vgl) to the scan lines 101. Together therewith, the control section 106 causes the signal detection circuit 105 to convert the electric signals, which flows in the signal lines 3 (in FIG. 6, at least one of the signal lines D2 and D6, for example, the signal line D2) connected to the radiation detection pixels 20B in a predetermined period 1H, into the digital data, thereby detects the radiation. Accordingly, the control section 106 repeats sampling. In the signal detection circuit 105, the amplifying circuit amplifies the electric signals flowing in the signal line D2 to convert the electric signals into the digital data, and the digital data is output to the control section 106. Note that the predetermined cycle 1H is made the same as the cycle with respect to one line when performing image read-out, or the reset operation by outputting the ON signals to the scan lines 101 sequentially one line at a time from the scan signal control circuit 104. However, the predetermined period 1H may be shorter than the image read-out or the period in which the reset operation is performed to one line.

The radiographic imaging device 100 is placed with an interval from a radiation generating device that generates radiation, and the radiographic imaging device 100 is irradiated by radiation that has been transmitted through an examinee.

When the radiographic imaging device 100 is irradiated with radiation, the radiation is absorbed by the scintillator, and is converted to visible light. The radiographic imaging device 100 may be irradiated with the radiation from either the front side or the back side of the radiation detecting element 10. The sensor sections 103 of the pixels 20 are illuminated with the visible light into which the radiation has been converted by the scintillator.

In the sensor sections 103, charges are generated inside when the sensor sections 103 are illuminated by light. The generated charges are collected by the lower electrodes 11.

In the radiographic imaging pixels 20A, the charges collected in the lower electrodes 11 are accumulated since the drain electrodes 13 and the source electrodes 9 are not short-circuited. On the other hand, in the radiation detection pixels 20B, the charges collected in the lower electrodes 11 flows in the signal lines 3 since the drain electrodes 13 and the source electrodes 9 short-circuit.

In the present exemplary embodiment, as shown in FIG. 6, the radiation detection pixels 20B are selectively placed with respect to specific signal lines 3 (here, D2 and D6 signal lines 3). The electric signals flowing out from the radiation detection pixels 20B are integrated per specific signal line 3. Namely, by plurally placing the radiation detection pixels 20B on the specific signal lines 3, the change in the level of the electric signals resulting from radiation becomes larger, and therefore the precision of radiation is detection can be raised.

The control section 106 compares the value of the digital data (into which the electric signals have been converted by the signal detection circuit 105) of the signal lines 3 (in the case of FIG. 6, at least one of D2 and D5; for example, D2) to which the pixels 20B are connected, with the predetermined threshold value for radiation detection. Then, the control section 106 determines whether the pixels have been irradiated with radiation on the basis of the value of the digital data is equal to or greater than the threshold value.

When irradiation of radiation is detected, after the elapse of a predetermined accumulation period, the control section 106 controls the scan signal control circuit 104 to cause ON signals to be outputted to the scan lines 101 sequentially one line at a time from the scan signal control circuit 104. Then, the scan signal control circuit 104 applies the ON signals sequentially via the scan lines 101 to the gate electrodes 2 of the TFT switches 4. Due thereto, the TFT switches 4 of the pixels 20A of the radiation detecting element 10 are sequentially switched ON, and electric signals corresponding to the charges that have been accumulated in the pixels 20A flow out to the signal lines 3. The signal detection circuit 105 converts the electric signals flowing in the signal lines 3 into digital data. The control section 106 performs predetermined processing with respect to the digital data into which the electric signals have been converted, performs processing that interpolates the image information of the radiation detection pixels 20B with respect to the image information to which the predetermined processing has been administered, and creates an image represented by the radiation with which the pixels have been irradiated.

In this way, according to the present exemplary embodiment, by disposing the radiographic imaging pixels 20A and the radiation detection pixels 20B in the imaging region of the radiation detecting element 10 in which a radiographic image is capable of being captured, radiation may be reliably detected even when the region irradiated by radiation has been narrowly set.

Further, according to the present exemplary embodiment, detection of irradiation of radiation may also be performed by the signal detection circuit 105 for radiographic imaging, so it is not necessary to separately dispose a detection circuit.

Further, according to the present exemplary embodiment, by giving the radiation detection pixels 20B the same shape as the radiographic imaging pixels 20A and dispersing and placing the radiation detection pixels 20B, artifact generation and a deterioration in the image quality of the radiographic images that are imaged may be prevented.

In the radiographic imaging apparatus 100 of the first exemplary embodiment, because the electric signals flows out from the signal lines 3 irrespective to the switching state of the TFT switches 4 of the radiation detection pixels 20B, the radiation may be detected by the sampling in the signal detection circuit 105 even in an off period in which the scan signal control circuit 104 outputs the OFF signal to each scan line 101.

Further, the radiographic imaging device 100 according to the present exemplary embodiment detects the start of irradiation of radiation, and starts the accumulation of charges in the pixels 20. Accordingly, the radiation with which the pixels have been irradiated in the period until irradiation with the radiation is detected, no longer contributes to the radiographic image. However, because the period of irradiation of radiation in normal imaging is equal to or greater than 100 ms, and the cycle 1H is around 100 µs, the radiation with which the pixels have been irradiated may be utilized with virtually no loss.

Further, according to the present exemplary embodiment, by intensively disposing the plural (in the present exemplary embodiment, 16 pixels) radiation detection pixels 20B on the specific signal lines 3, charges corresponding to a several-fold (in the present exemplary embodiment, a 16-fold) increase over that of a case where only one of the radiation detection pixels 20B is disposed can be obtained. Due thereto, irradiation of radiation can be detected at a stage where there is little radiation energy, and the radiographic imaging device 100 can move to the accumulation action. Namely, the present exemplary embodiment may reduce radiation loss. In particular, with X-rays, the response characteristic is slow and there are many cases where high energy does not appear in the initial stage of irradiation. For this reason, by intensively disposing the plural radiation detection pixels 20B on the specific signal lines 3, the precision of detecting the start of irradiation with X-rays may improve.

Second Exemplary Embodiment

Next, a second exemplary embodiment of the present invention will be described.

The configurations of the radiation detection element 10 and the radiographic imaging apparatus 100 of the second exemplary embodiment and the operational flow at the time of imaging the radiation image are same to those of the first exemplary embodiment (see FIGS. 1 to 7). Therefore, the descriptions thereof will be omitted.

Figure 10:
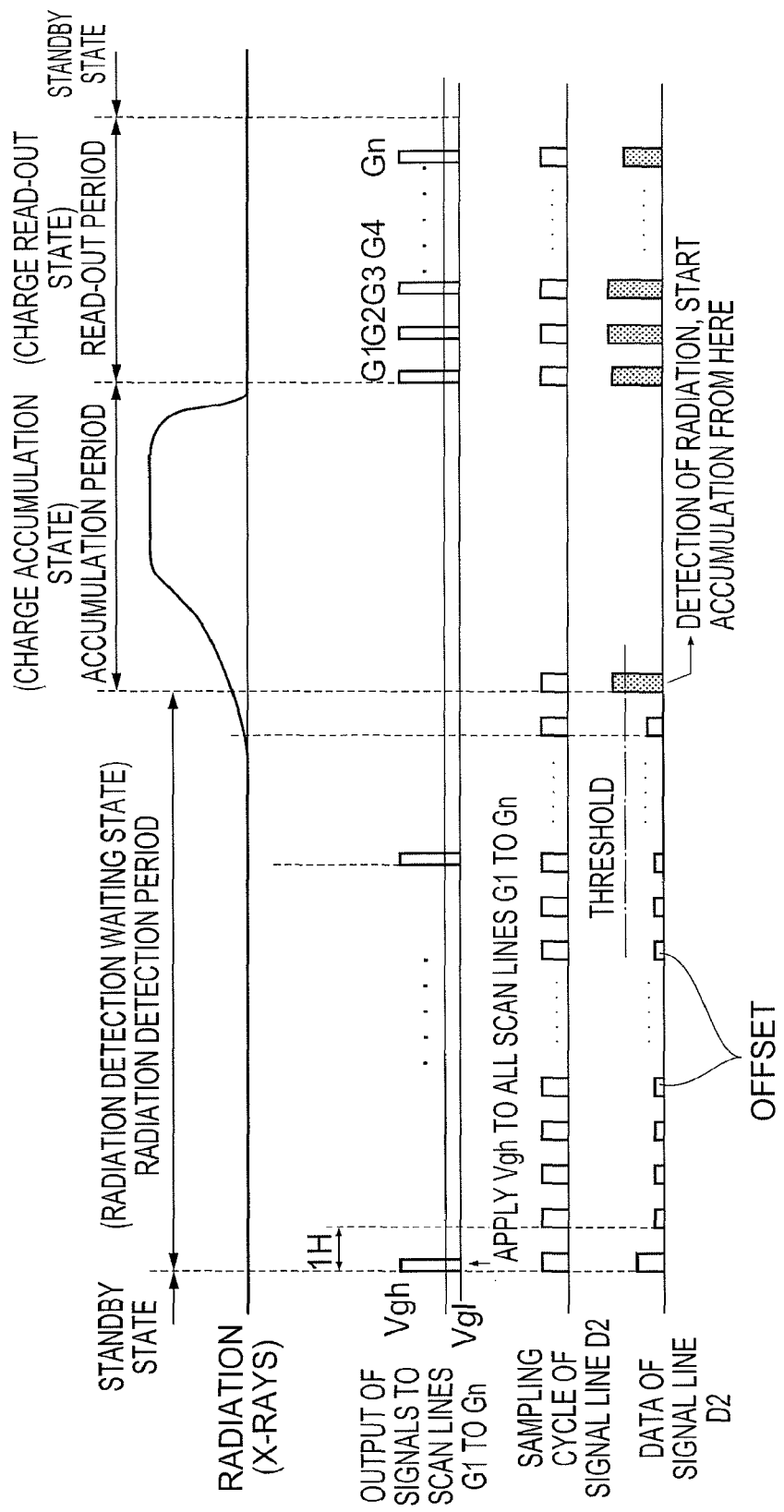
FIG. 10 is a timing chart illustrating the detailed operation flow when imaging a radiation image by a radiographic imaging apparatus according to a second exemplary embodiment of the present invention.

FIG. 10 is a timing chart illustrating the detailed operation flow at the time of imaging the radiation image by the radiographic imaging apparatus 100 of the second exemplary embodiment.

The control section 106 moves to the radiation detection waiting state when it is notified of the movement to the imaging mode. During the radiation detection waiting state, the control section 106 controls the scan signal control circuit 104 to output an OFF signal to each of the scan lines 101. Together therewith, the control section 106 causes the signal detection circuit 105 to convert the electric signals, which flows in the signal lines 3 (in FIG. 6, at least one of the signal lines D2 and D6, for example, the signal line D2) connected to the radiation detection pixels 20B in a predetermined period 1H, into the digital data, thereby detects the radiation. Accordingly, the control section 106 repeats sampling.

However, if a radiation detection waiting time is long, the charges may be accumulated in each pixel 20 due to the dark current. Therefore, in the second exemplary embodiment, the reset operation is performed by the control section 106. In the reset operation, the control section 106 controls the scan signal control circuit 104 to output the ON signal to all the scan lines 101, thereby extracts the charges accumulated in each pixel 20.

The control section 106 compares the value of the digital data of the signal lines 3 connected to the radiation detection pixels 20B, into which the electric signals is converted by the signal detection circuit 105, with the predetermined radiation detection threshold. Then, the control section 106 determines whether the radiation is detected, based on whether the value of the digital data becomes the threshold or more.

When the control section 106 detects irradiation of radiation, it stops the reset operation and allows the charges to be accumulated in the radiographic imaging pixels 20A of the radiation detecting element 10. After the elapse of a predetermined accumulation period, the control section 106 controls the scan signal control circuit 104 to cause ON signals to be outputted to the scan lines 101 sequentially one line at a time from the scan signal control circuit 104. Then, the scan signal control circuit 104 applies the ON signals sequentially via the scan lines 101 to the gate electrodes 2 of the TFT switches 4. Due thereto, the TFT switches 4 of the radiographic imaging pixels 20A of the radiation detecting element 10 are sequentially switched ON, and electric signals corresponding to the charges that have been accumulated in the radiographic imaging pixels 20A flow out to the signal lines 3. The signal detection circuit 105 converts the electric signals flowing in the signal lines 3 into digital data. The control section 106 performs predetermined processing with respect to the digital data into which the electric signals have been converted, performs processing that interpolates the image information of the radiation detection pixels 20B with respect to the image information to which the predetermined processing has been administered, and creates an image represented by the radiation with which the pixels have been irradiated.

According to the second exemplary embodiment, the electric signals also flow in the signal lines 3 by the reset operation during the radiation detection waiting state. However, since the plural radiation detection pixels 20B are disposed in the specific signal lines 3, the radiation irradiation and the reset operation may be easily distinguished from each other from, the electric signals level.

According to the second exemplary embodiment, the radiation is detected with a delay of period 1H if the irradiation of radiation is performed while the reset operation that outputs the ON signal to all the scan lines 101. However, as described above, in the normal imaging, the radiation irradiation period is 100 ms or more, and the predetermined period 1H is about 100 μs, and therefore the loss of the radiation may be suppressed to about 0.1%.

According to the second exemplary embodiment, because the reset operation is performed by outputting ON signal to all the scan lines 101, a step of the image due to the stop of the reset operation may not be generated.

Third Exemplary Embodiment

A third exemplary embodiment of the present invention will be described below.

The configurations of the radiation detection element 10 and the radiographic imaging apparatus 100 of the third exemplary embodiment and the operational flow at the time of imaging the radiation image are same to those of the first exemplary embodiment (see FIGS. 1 to 7). Therefore, the descriptions thereof will be omitted.

Figure 11:
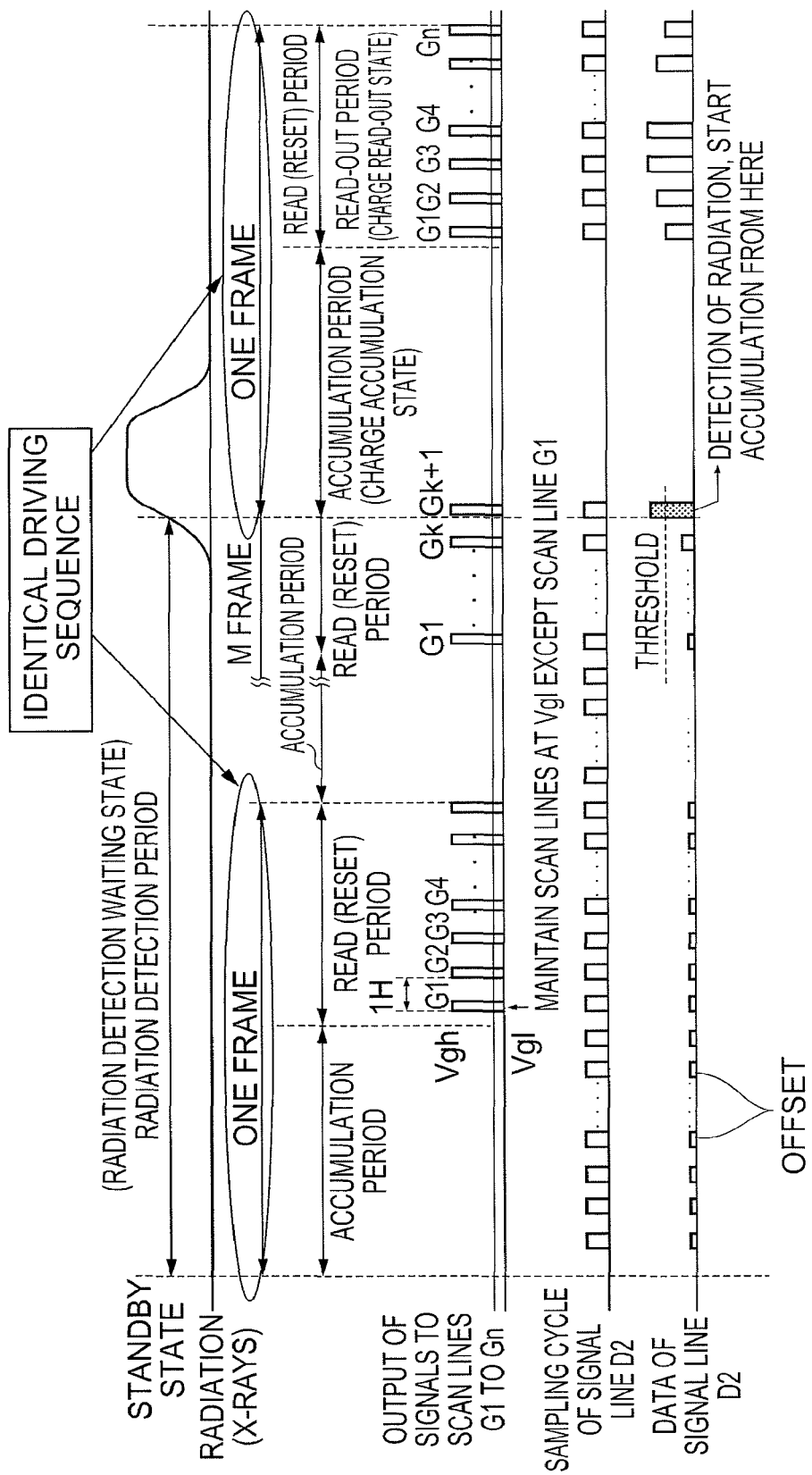
FIG. 11 is a timing chart illustrating the detailed operation flow at the time of imaging a radiation image by a radiographic imaging apparatus according to a third exemplary embodiment of the present invention.

FIG. 11 is a timing chart illustrating the detailed operation flow at the time of imaging the radiation image by the radiographic imaging apparatus 100 of the third exemplary embodiment.

The control section 106 moves to the radiation detection waiting state when it is notified of the movement to the imaging mode. During the radiation detection waiting state, the control section 106 controls the scan signal control circuit 104 to output an OFF signal to each of the scan lines 101. Together therewith, the control section 106 causes the signal detection circuit 105 to convert the electric signals, which flows in the signal lines 3 (in FIG. 6, at least one of the signal lines D2 and D6, for example, the signal line D2) connected to the radiation detection pixels 20B in a predetermined period 1H, into the digital data, thereby detects the radiation. Accordingly, the control section 106 repeats sampling.

However, if a radiation detection waiting time is long, the charges may be accumulated in each pixel 20 due to the dark current. Therefore, in the third exemplary embodiment, the reset operation is performed by the control section 106. In the reset operation, the control section 106 controls the scan signal control circuit 104 to output the ON signal to each of the scan lines 101 one line at a time, sequentially turns on the TFT switches 4 connected to the scan lines 101 one line at a time, and thereby extracts the charges accumulated in each pixel 20.

The control section 106 compares the value of the digital data of the signal lines 3 connected to the radiation detection pixels 20B, into which the electric signals is converted by the signal detection circuit 105, with the predetermined radiation detection threshold. Then, the control section 106 determines whether the radiation is detected, based on whether the value of the digital data becomes the threshold or more.

When the control section 106 detects irradiation of radiation, it stops the reset operation and allows the charges to be accumulated in the radiographic imaging pixels 20A of the radiation detecting element 10. After the elapse of a predetermined accumulation period, the control section 106 controls the scan signal control circuit 104 to cause ON signals to be outputted to the scan lines 101 sequentially one line at a time from the scan signal control circuit 104. Then, the scan signal control circuit 104 applies the ON signals sequentially via the scan lines 101 to the gate electrodes 2 of the TFT switches 4. Due thereto, the TFT switches 4 of the radiographic imaging pixels 20A of the radiation detecting element 10 are sequentially switched ON, and electric signals corresponding to the charges that have been accumulated in the radiographic imaging pixels 20A flow out to the signal lines 3. The signal detection circuit 105 converts the electric signals flowing in the signal lines 3 into digital data. The control section 106 performs predetermined processing with respect to the digital data into which the electric signals have been converted, performs processing that interpolates the image information of the radiation detection pixels 20B with respect to the image information to which the predetermined processing has been administered, and creates an image represented by the radiation with which the pixels have been irradiated.

Further, according to the present exemplary embodiment, during the radiation detection waiting period, the electric signals resulting from the reset operation also flow in the signal lines 3. However, because the radiation detection pixels 20B are plurally placed on the specific signal lines 3, the present exemplary embodiment may distinguish between irradiation of radiation and the reset operation from the level of the electric signals easily.

Further, according to the present exemplary embodiment, during the radiation detection waiting period, the same reset operation as in the standby state is performed. Accordingly, in the present exemplary embodiment, the most recent data for offset correction may be acquired. Since the offset generated in the pixels 20 of the radiation detecting element 10 may change over time in accordance with the state of the radiation detecting element 10, noise in radiographic images may be reduced by performing correction on the basis of the most recent data for offset correction.

Further, according to the present exemplary embodiment, the reset operation is stopped when irradiation of radiation has been detected. Accordingly, the present exemplary embodiment may keep the radiation loss resulting from the reset operation to only one line's worth. In a case where the radiation at the point in time when irradiation with the radiation starts is small, the present exemplary embodiment may use that image as is, because the ratio of radiation loss is small. As a result of stopping the reset operation, a step occurs in the image at the line where the reset operation was stopped in the radiographic image. However, the step may be corrected by performing interpolation process from the image information of the line adjacent to the step.

Fourth Exemplary Embodiment

A fourth exemplary embodiment of the present invention will be described below.

The configurations of the radiation detection element 10 and the radiographic imaging apparatus 100 of the fourth exemplary embodiment and the operational flow at the time of imaging the radiation image are same to those of the first exemplary embodiment (see FIGS. 1 to 7). Therefore, the descriptions thereof will be omitted.

Figure 12:
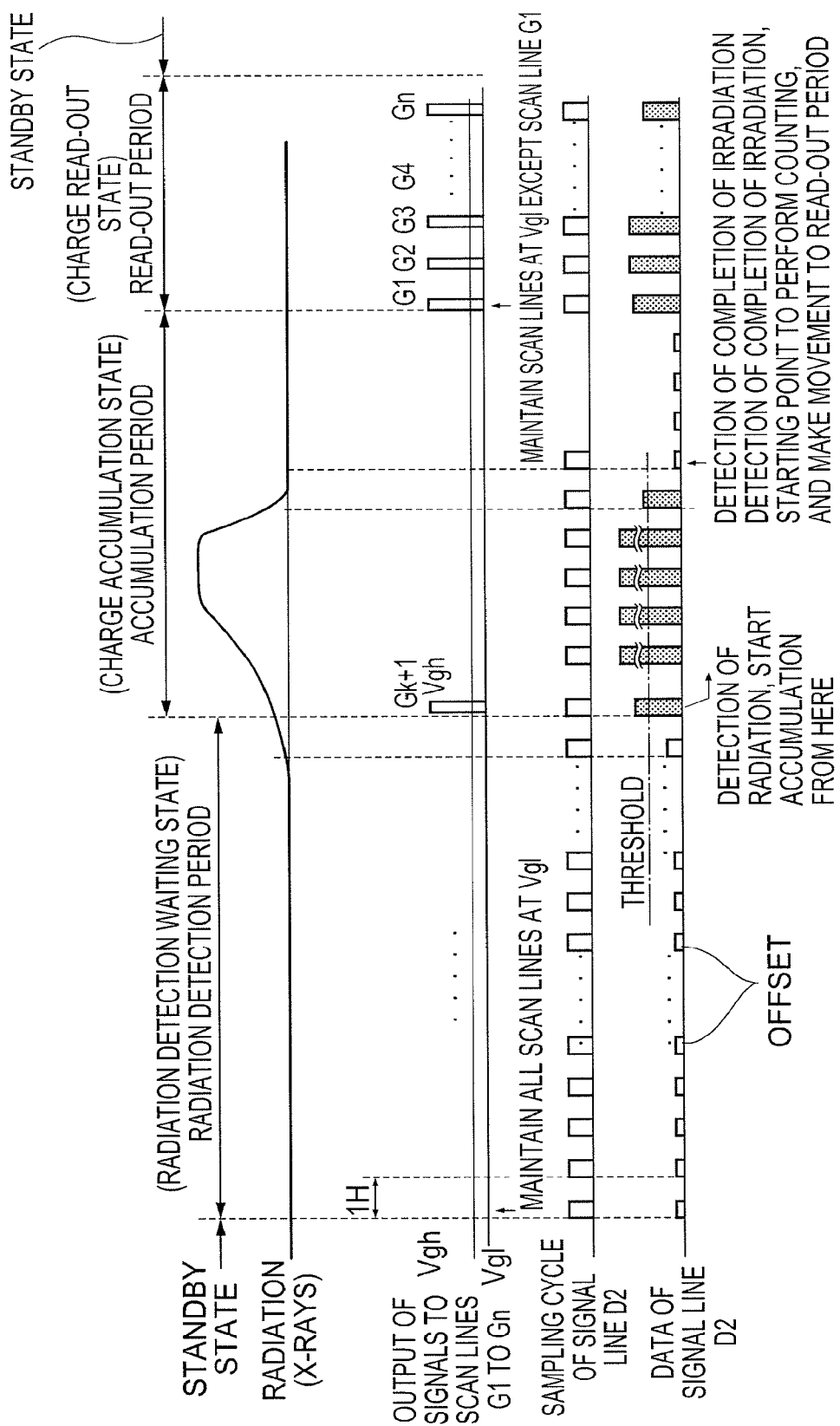
FIG. 12 is a timing chart illustrating the detailed operation flow when imaging a radiation image by a radiographic imaging apparatus according to a fourth exemplary embodiment of the present invention.

FIG. 12 is a timing chart illustrating the detailed operation flow at the time of imaging the radiation image by the radiographic imaging apparatus 100 of the fourth exemplary embodiment.

In the radiographic imaging apparatus 100 of the fourth exemplary embodiment, the sampling is repeatedly performed similarly to the first exemplary embodiment. In the sampling, the scan signal control circuit 104 outputs the OFF signal (the signal having the potential Vgl) to each scan line 101. Together therewith, the signal detection circuit 105 converts the electric signals flowing in the signal lines 3 (in FIG. 6, at least one of the signal lines D2 and D6, for example, the signal line D2), connected to the radiation detection pixels 20B, into the digital data in the predetermined period 1H, thereby detects the radiation.

Even after the radiation irradiation is detected, the control section 106 repeats the sampling in which the signal detection circuit 105 converts the electric signals flowing in the signal lines 3 connected to the radiation detection pixels 20B, into the digital data to detect the radiation in the predetermined period 1H.

When the irradiation of radiation from the radiation generation apparatus is ended, the charges generated in the radiation detection pixels 20B decreases, and the level of the electric signals flowing in the signal lines 3 lowers.

The control section 106 compares the value of the digital data of the signal lines 3 connected to the radiation detection pixels 20B, into which the electric signals is converted by the signal detection circuit 105, with the predetermined radiation detection threshold. Then, the control section 106 determines whether the irradiation of radiation has ended, based on whether the value of the digital data becomes the threshold or less.

When the end of the irradiation of radiation is detected, the control section 106 stands by for a predetermined end standby period from the detection of the end of irradiation of radiation. Then the control section 106 controls the scan signal control circuit 104 to output the ON signal to each of the scan lines 101 one line at a time, sequentially turns ON the TFT switches 4 connected to the scan lines 101 one line at a time. Accordingly, the control section 106 read-out the charges accumulated in each pixel 20A of the radiation detection element 10, and generates the image expressed by the read electric signals. Note that the control section 106 may control the scan signal control circuit 104 to sequentially output the ON signal to the scan lines 101 one line at a time, as soon as the end of the irradiation of radiation is detected.

According to the fourth exemplary embodiment, the radiation detection element 10 and the radiographic imaging apparatus 100 may detect the timing of the end of the irradiation of radiation by performing the sampling of the signal lines 3 connected to the radiation detection pixels 20B when the radiation is irradiated.

Fifth Exemplary Embodiment

A fifth exemplary embodiment of the present invention will be described below.

The configurations of the radiation detection element 10 and the radiographic imaging apparatus 100 of the fifth exemplary embodiment and the operational flow at the time of imaging the radiation image are same to those of the first exemplary embodiment (see FIGS. 1 to 7). Therefore, the descriptions thereof will be omitted.

As described above, even when the radiation detection element 10 is not irradiated with the radiation, the charges are generated by the dark current or the like and are accumulated in each pixel 20. Therefore, even in the standby state, a reset operation is repeatedly performed in the radiographic imaging apparatus 100, to extract and remove the charges accumulated in each pixel 20 of the radiation detection element 10. Through the reset operation, even when the irradiation of radiation is not performed, the electric signals (so-called offset) flows in each signal line 3 due to the charges generated by the dark current or the like. Information on the charges read out by the reset operation is used to correct an offset generated in the radiation image due to the dark current or the like.

In the radiation detection element 10, sometimes a noise may be generated in each signal line 3 due to various disturbance factors such as shock or temperature. Accordingly, the electric signals flowing in each signal line 3 may include offset caused by the dark current and the noise. Particularly the noise caused by the disturbance factor may largely change the electric signals.

Therefore, in a case in which the electric signals flowing in the signal lines 3 (in FIG. 6, at least one of the signal lines D2 and D6) connected to the radiation detection pixels 20B is converted into the digital data, the value of the digital data is compared with the predetermined radiation detection threshold, and the control section 106 determines whether the radiation is detected based on whether the value of the digital data becomes the threshold or more, it is necessary to increase the radiation detection threshold in order to prevent the false detection of the start of the irradiation of the radiation due to the noise superposed on each signal line 3. However, if the radiation detection threshold is increased, the timing of the detection of the irradiation of the radiation may be delayed.

Figure 13:
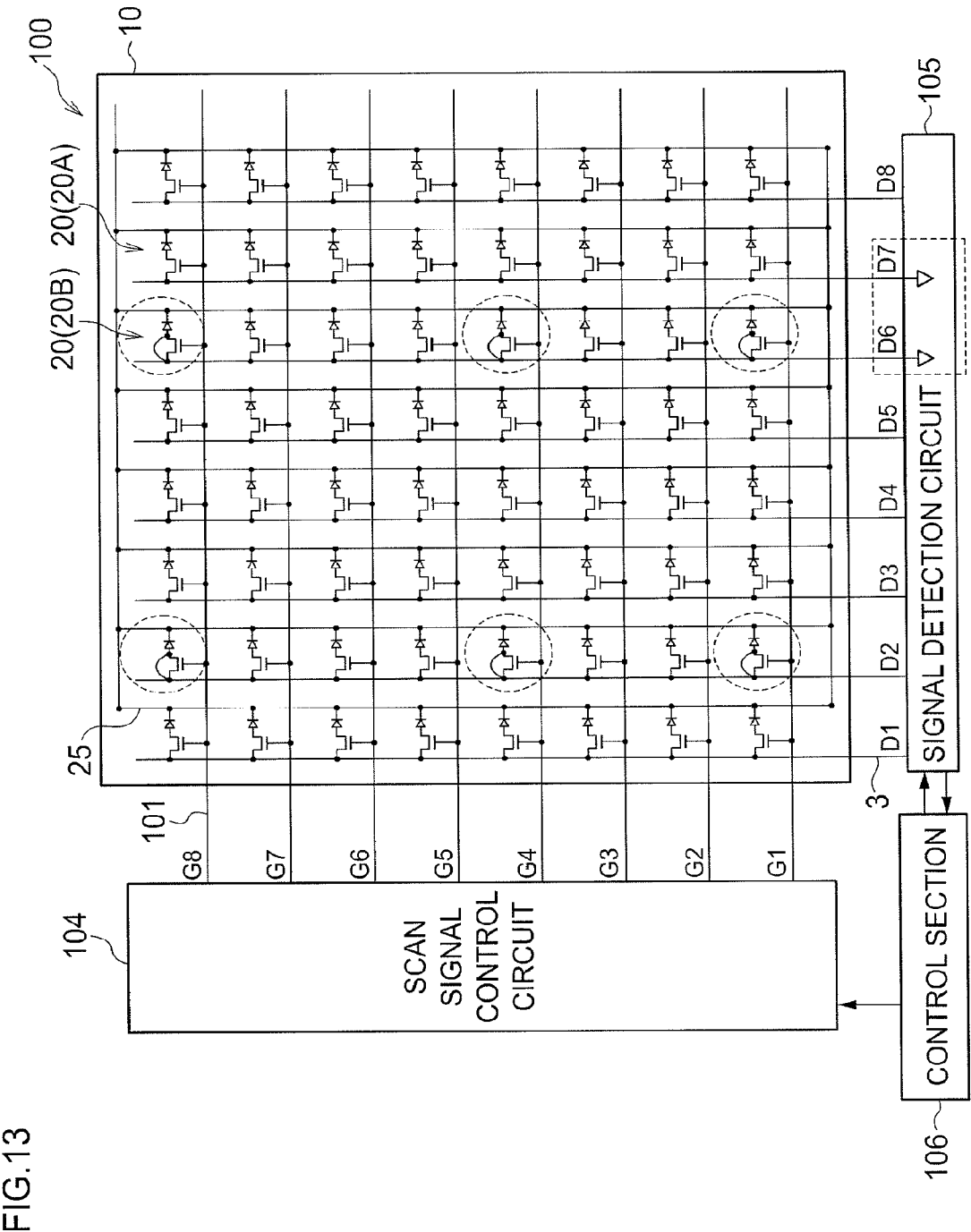
FIG. 13 is a configuration diagram illustrating an entire configuration of a radiation detection element according to a fifth exemplary embodiment of the present invention.

Therefore, in the fifth exemplary embodiment, the sampling is repeatedly performed as shown in FIG. 13. In the sampling, the signal detection circuit 105 converts both the electric signals flowing in the signal lines 3 (in FIG. 13, at least one of the signal lines of D2 and D6, in this case, the signal line D6) connected to the radiation detection pixels 20B in the predetermined period 1H, and the electric signals flowing in the signal lines 3 (in FIG. 13, the signal lines of D1, D3 to D5, D7, and D8, in this case, the signal line D7) that are not connected to the radiation detection pixels 20B into the digital data for detecting the radiation. If similar noises are generated in each signal line 3, any signal lines 3 not connected to the radiation detection pixels 20B may be used to perform the sampling along with the signal lines 3 connected to the radiation detection pixels 20B. However, if the generated noise varies in the signal lines 3 depending on its position, the signal lines 3 is located near the sampling target signal lines 3 connected to the radiation detection pixels 20B and connected to the same signal detection circuit 105 may be used as the sampling target signal lines 3. In the fifth exemplary embodiment, the sampling is performed to the signal line D7 that is provided adjacent to the sampling target signal line D6 connected to the radiation detection pixels 20B.

The signals flowing in the signal lines 3 are converted by the signal detection circuit 105 to digital data. The control section 106 subtracts the value of the digital data of the signal line D7, not connected to the radiation detection pixels 20B, from the value of the digital data of the signal line D6 connected to the radiation detection pixels 20B. Then, the control section 106 compares the subtracted value of the digital data with a predetermined radiation detection threshold, and determines whether the radiation is detected based on whether the value of the digital data becomes the threshold or more.

Figure 14:
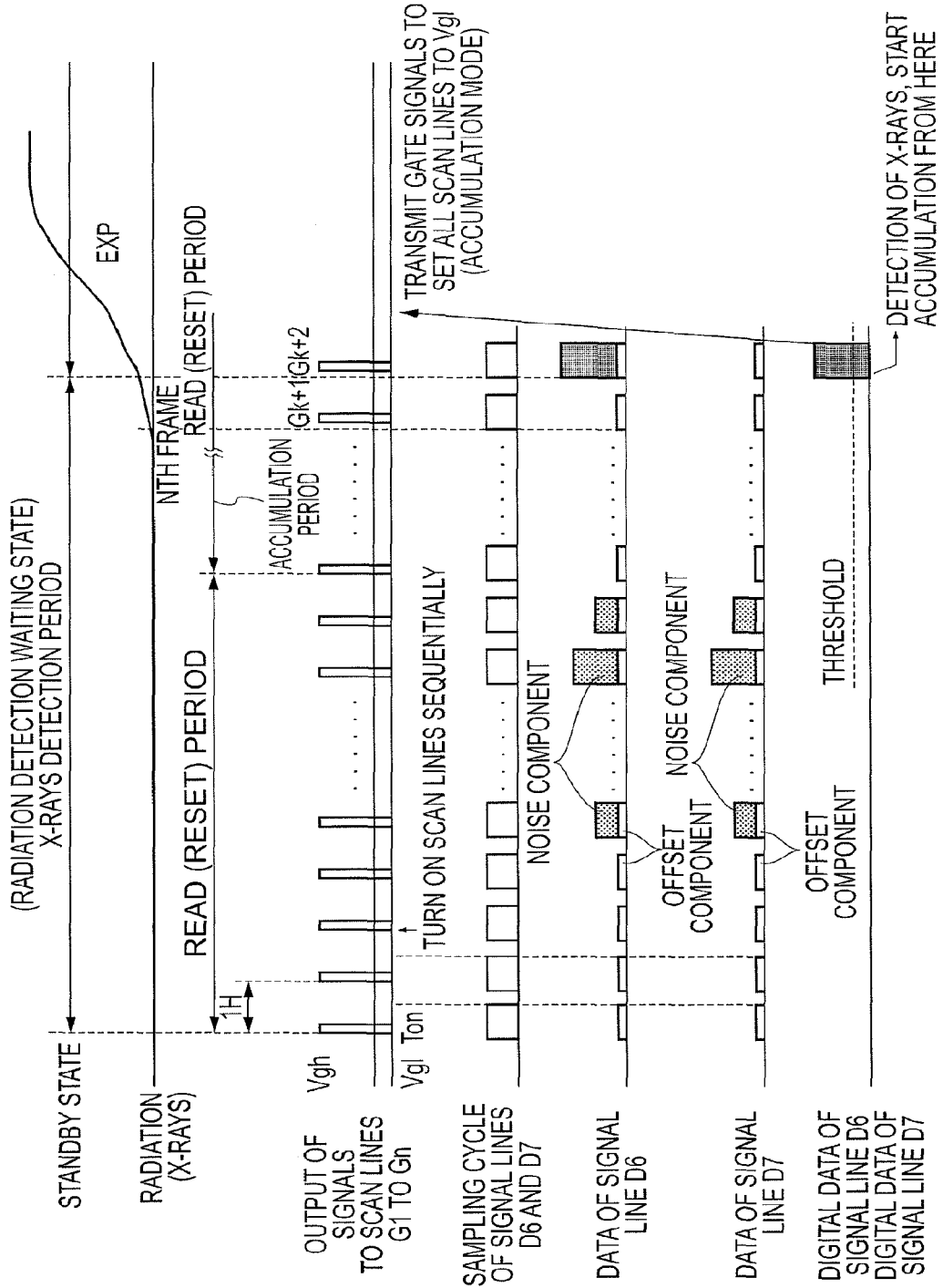
FIG. 14 is a timing chart illustrating the detailed operation flow at the time of imaging a radiation image by the radiographic imaging apparatus of the fifth exemplary embodiment.

FIG. 14 is a timing chart illustrating the detailed operation flow at the time of imaging the radiation image by the radiographic imaging apparatus 100 of the fifth exemplary embodiment.

In the radiographic imaging apparatus 100 of the fifth exemplary embodiment, the sampling is repeatedly performed similarly to the first exemplary embodiment. In the sampling, the scan signal control circuit 104 outputs the OFF signal (the signal having the potential Vgl) to each scan line 101. Together therewith, the signal detection circuit 105 converts the electric signals flowing in the signal lines 3 (in FIG. 13, for example, the signal line D6) connected to the radiation detection pixels 20B, and the electric signals flowing in the signal lines 3 (in FIG. 13, for example, the signal line D7) that is not connected to the radiation detection pixels 20B, into the digital data in the predetermined period 1H, thereby detects the radiation. In the signal detection circuit 105, the amplifying circuit amplifies the electric signals flowing in the signal line D6 and the electric signals flowing in the signal line D7, to convert the electric signals into the digital data, and is output to the control section 106.

In the fifth exemplary embodiment, even in the radiation detection waiting state, the control section 106 performs the reset operation similarly to the standby state of the third exemplary embodiment. In the reset operation, the control section 106 controls the scan signal control circuit 104 to sequentially output the ON signal to the scan lines 101, and controls the scan signal control circuit 104 to sequentially turn on the TFT switches 4 connected to the scan lines 101, thereby extracting the charges accumulated in each pixel 20.

The signals flowing in the signal lines 3 are converted by the signal detection circuit 105 to digital data. The control section 106 subtracts the value of the digital data of the signal line D7, not connected to the radiation detection pixels 20B, from the value of the digital data of the signal line D6 connected to the radiation detection pixels 20B. Then, the control section 106 compares the subtracted value of the digital data with a predetermined radiation detection threshold, and determines whether the radiation is detected based on whether the value of the digital data becomes the threshold or more.

Figure 15:
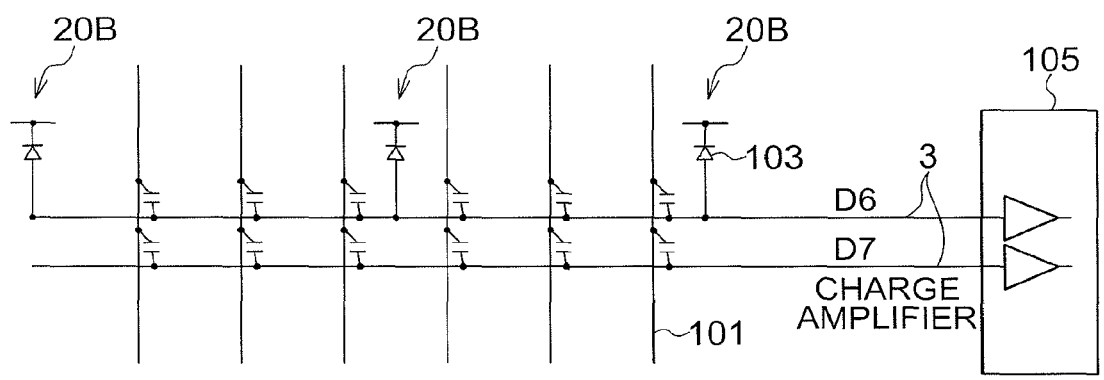
FIG. 15 is an equivalent circuit in focusing on signal lines D6 and D7 of a radiation detection element of the fifth exemplary embodiment.

FIG. 15 shows an equivalent circuit of the signal lines 3 D6 and D7 of the radiation detection element 10 of the fifth exemplary embodiment. FIG. 15 shows capacitance caused by the intersection of the signal line 3 and the scan line 101 as a capacitor in each intersecting portion.

If the noise is caused by the disturbance factor in each signal line 3, the substantially same noise may be generated in the signal lines 3 D6 and D7 because the signal lines 3 of D6 and D7 are adjacent to each other. Further, when the radiation is irradiated, the electric signals also flow in the signal line D6 from the radiation detection pixel 20B.

Therefore, a noise component may be cancelled by converting the electric signals flowing in the signal lines 3 D6, D7 into the digital data, and subtracting the value of the digital data of the signal line D7 from the value of the digital data of the signal line D6.

According to the fifth exemplary embodiment, even if the noise is caused by the disturbance factor in each signal line 3, the value of the noise component may be cancelled by subtracting the value of the digital data of the signal line D7, not connected to the radiation detection pixels 20B, from the value of the digital data of the signal line D6, connected to the radiation detection pixels 20B. Further, if similar offsets are generated in the signal lines 3, the value of the offset component may also be cancelled. Accordingly, since the noise component or the offset component may be cancelled, it is not necessary to increase the radiation detection threshold by considering the noise component. Therefore, the start of the radiation irradiation may be detected earlier.

In the first to fifth exemplary embodiments, the TFT switches 4 are formed by short-circuiting the source and drain in the radiation detection pixel 20B. Alternatively, for example, the sensor sections 103 may directly be connected to the signal lines 3 without forming the TFT switches 4 there between.

Figure 16:
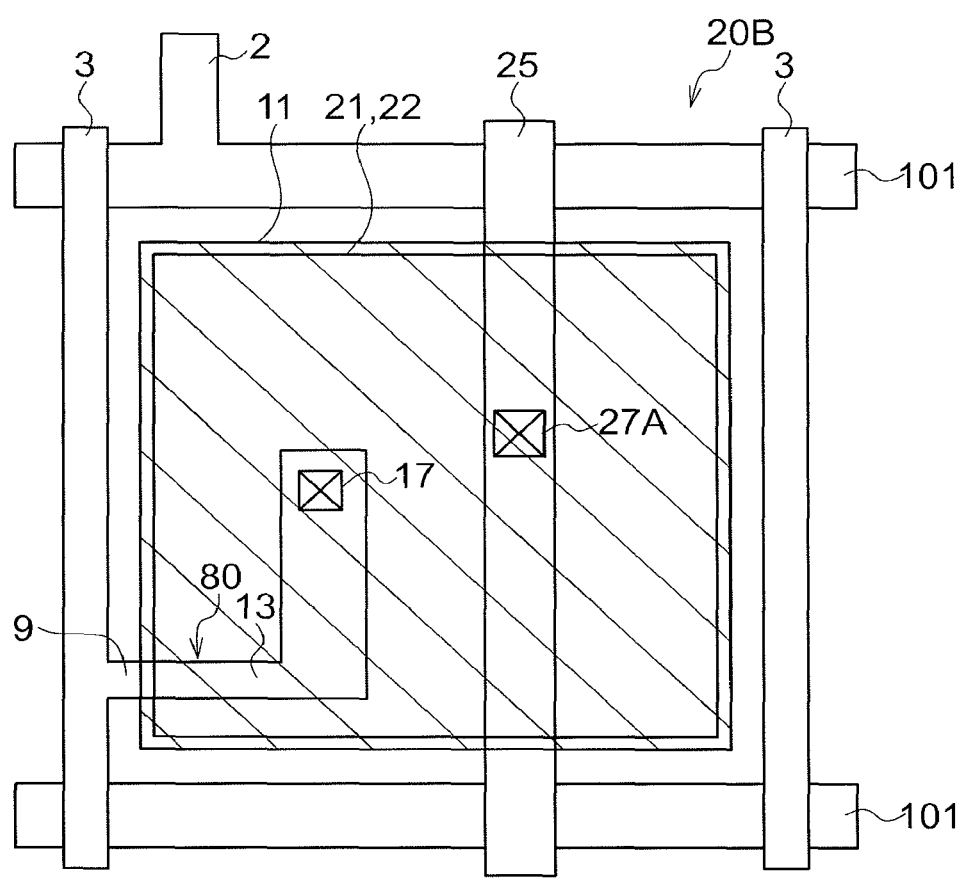
FIG. 16 is a plan view illustrating a configuration of a radiation detection element according to an alternative exemplary embodiment of the present invention.
Figure 17:
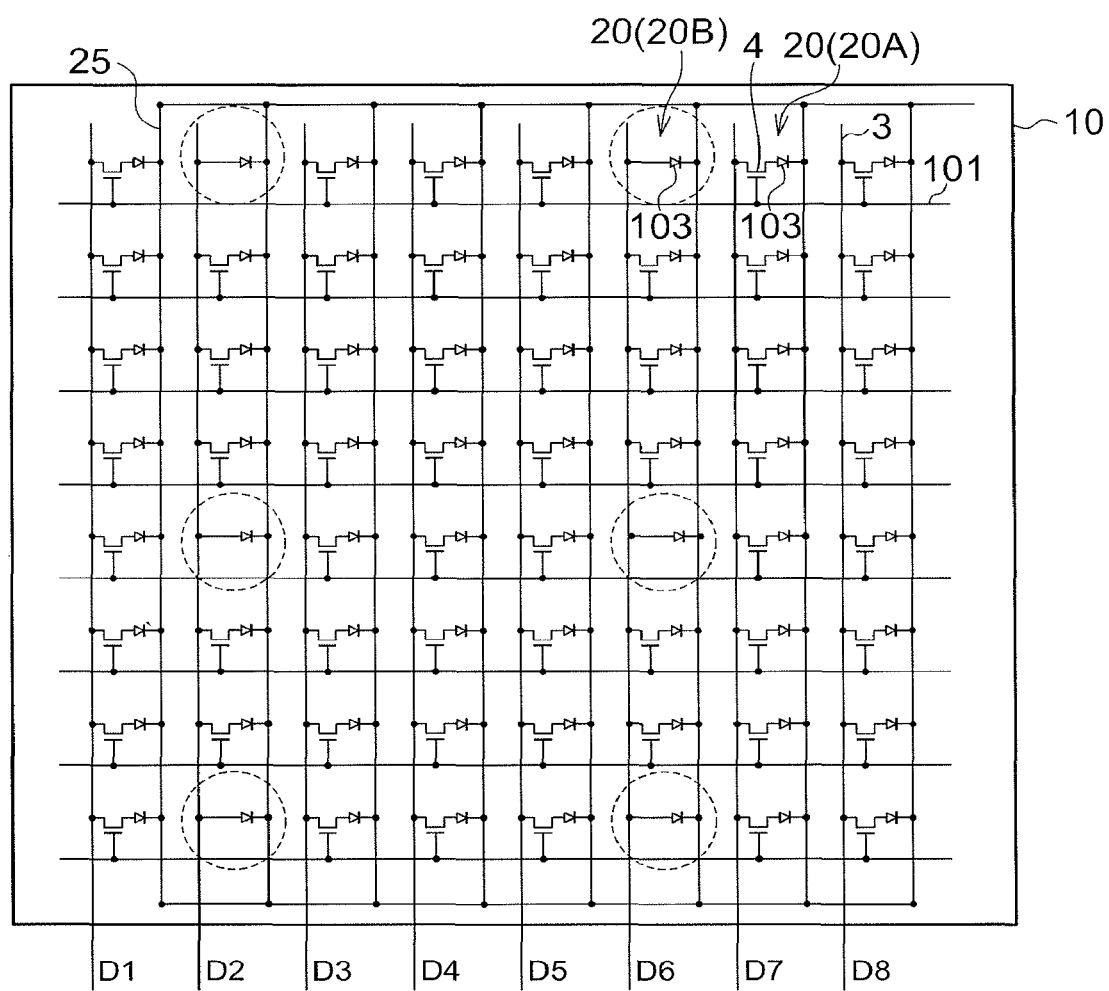
FIG. 17 is a configuration diagram illustrating an entire configuration of a radiation detection element according to an alternative exemplary embodiment of the present invention.

For example, as shown in FIG. 16, in the radiation detection pixel 20B, the source electrodes 9 and the drain electrodes 13 may be connected without providing the gate electrodes 2, and the semiconductor active layer 8, and the lower electrodes 11 of the sensor sections 103 and the signal lines 3 may electrically be connected to form a connection lines 80. In such cases, as shown in FIG. 17, the sensor sections 103 are electrically connected to the signal lines 3 through the TFT switches 4 in the radiographic imaging pixel 20A. On the other hand, in the radiation detection pixel 20B, the TFT switches 4 are not provided, but the sensor sections 103 are directly connected to the signal lines 3.

Figure 18:
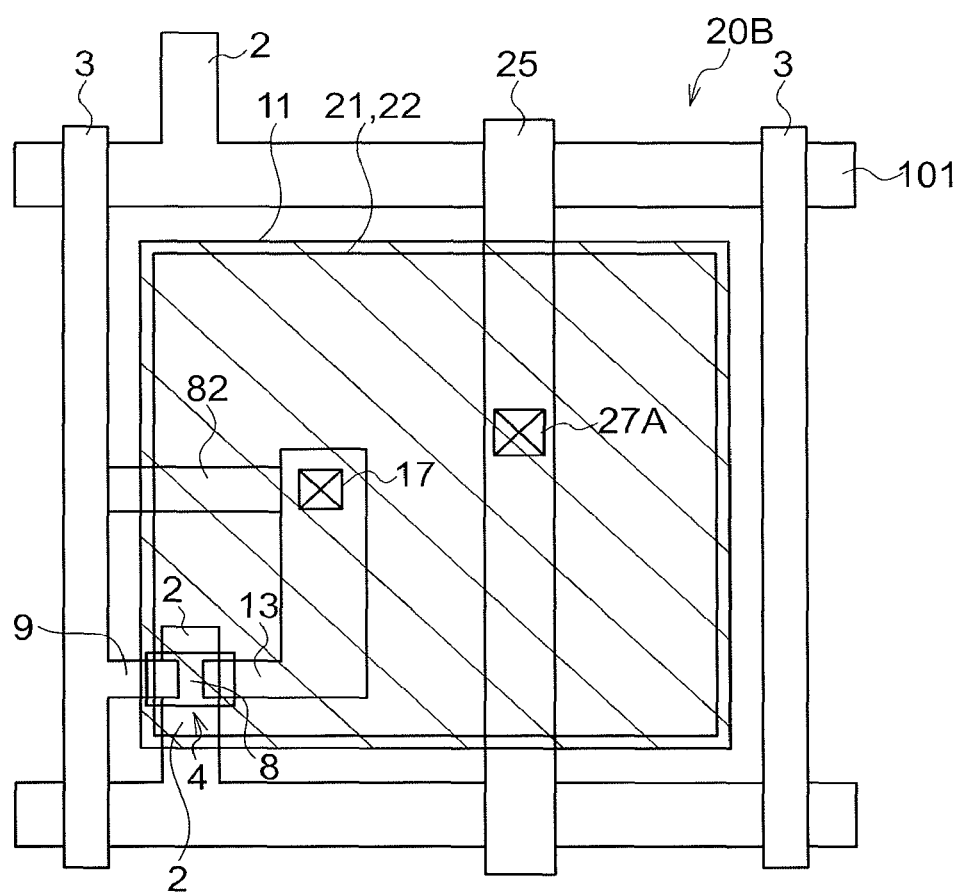
FIG. 18 is a plan view illustrating a configuration of a radiation detection element according to an alternative exemplary embodiment of the present invention.
Figure 19:
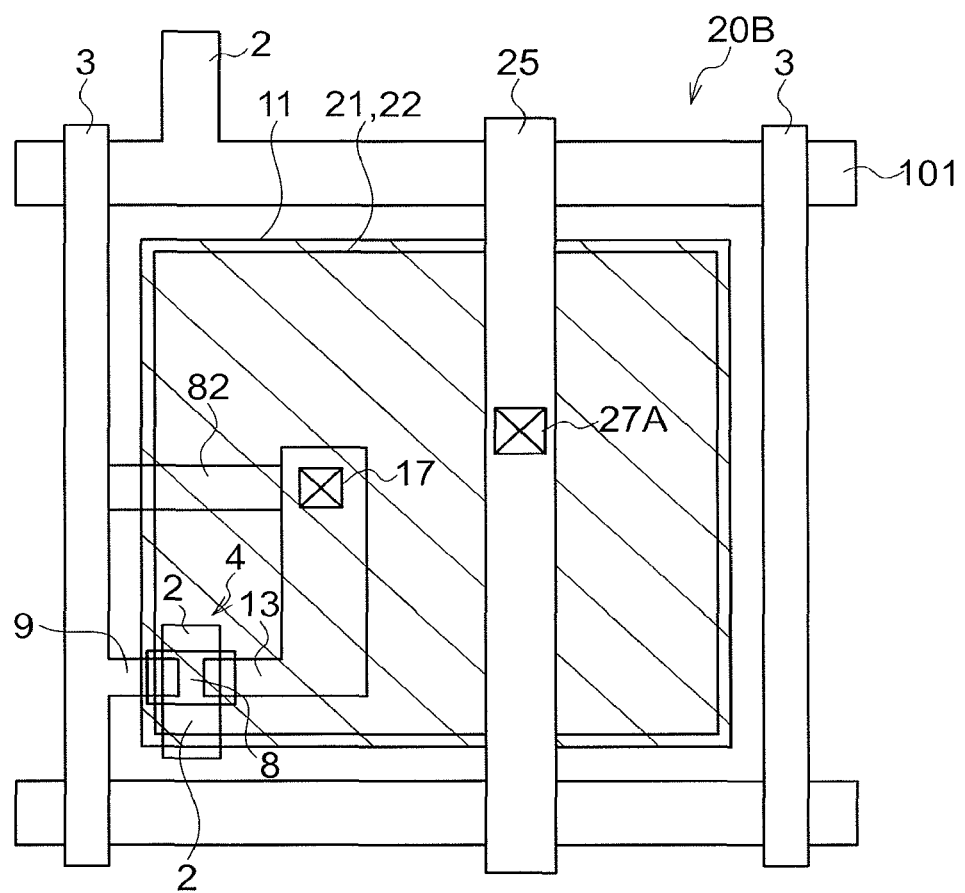
FIG. 19 is a plan view illustrating a configuration of a radiation detection element according to an alternative exemplary embodiment of the present invention.

In the first to fifth exemplary embodiments, the TFT switches 4 are formed by short-circuiting the source and drain in the radiation detection pixel 20B. Alternatively, for example, connection lines 82 may be formed in the middle of the drain electrodes 13, and may be connected to the signal lines 3 as shown in FIG. 18. Even in this case, the source and the drain of the TFT switches 4 are substantially short-circuited. In the case in which the source and the drain of the TFT switches 4 are short-circuited as shown in the first to fifth exemplary embodiments and FIG. 18, the gate electrodes 2 may be formed while separated from the scan lines 101 as shown in FIG. 19.

Figure 21:
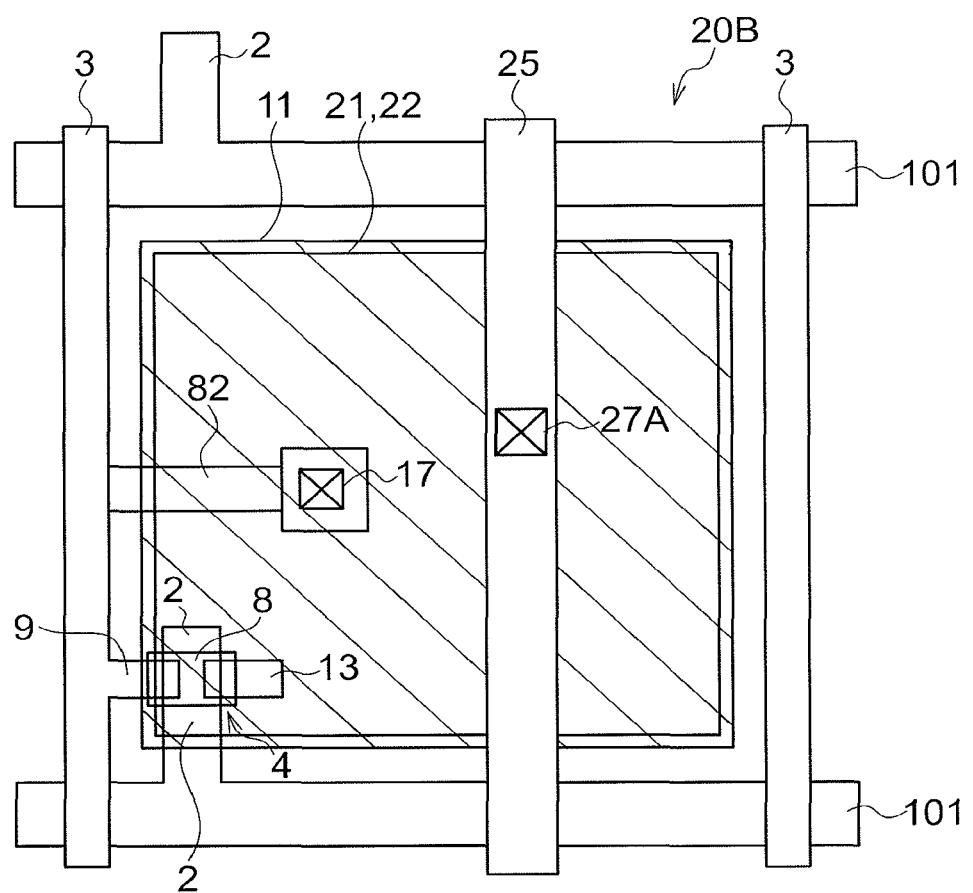
FIG. 21 is a configuration diagram illustrating an entire configuration of a radiation detection element according to an alternative exemplary embodiment of the present invention.

For example, as shown in FIG. 21, in the radiation detection pixels 20B, the connection lines 82 may be formed to connect the sensor sections 103 and the signal lines 3 through the connection lines 82 and the contact holes 17, and the drain electrodes 13 and the contact holes 17 may electrically be cut off.

In the radiation detection pixels 20B, in the case in which the source electrodes 9 and the drain electrodes 13 of the TFT switches 4 are short-circuited as shown in FIGS. 2 and 4, a capacitance Cgd between the gate electrodes 2 and the drain electrodes 13 becomes larger than that of the radiographic imaging pixels 20A. Therefore, in the radiation detection element 10, difference in offset charge amount may be generated due to the line capacitance difference between the signal lines 3 connected to the radiation detection pixel 20B, and other signal lines 3 that are not connected to the radiation detection pixel 20B.

On the other hand, in the radiation detection pixels 20B, in a case in which the source electrodes 9 and the drain electrodes 13 are connected without providing the gate electrodes 2 and the semiconductor active layer 8 as shown in FIG. 16, the capacitance Cgd becomes zero because of the elimination of the TFT switches 4. However, in the radiation detection element 10, difference in line capacitance between the signal lines 3 connected to the radiation detection pixels 20B and signal lines 3 that are not connected to the radiation detection pixels 20B increases, generates a difference in feed-through voltage between the signal lines 3 connected to the radiation detection pixel 20B and the signal lines 3 that are not connected to the radiation detection pixels 20B, and thereby generates difference in offset charge amount.

On the other hand, in the radiation detection pixels 20B, in the case in which the connection lines 82 are formed in the middle of the drain electrodes 13 to connect the sensor sections 103 and the signal lines 3 as shown in FIG. 18, the difference in line capacitance between the signal lines 3 connected to the radiation detection pixel 20B and the signal lines 3 that are not connected to the radiation detection pixel 20B may be decreased. In the radiation detection pixels 20B, when the drain electrodes 13 and the contact holes 17 are electrically cut off while the connection lines 82 are formed to connect the sensor sections 103 and the signal lines 3 as shown in FIG. 21, the difference in line capacitance between the signal lines 3 connected to the radiation detection pixel 20B and the signal lines 3 that are not connected to the radiation detection pixel 20B may further be decreased.

Here, the radiation detection pixel 20B (hereinafter referred to as a pixel 20B-1) in which the source electrode 9 and the drain electrode 13 of the TFT switch 4 are short-circuited as shown in FIGS. 2 and 4, the radiation detection pixel 20B (hereinafter referred to as a pixel 20B-2) in which the source electrode 9 and the drain electrode 13 are connected without providing the gate electrode 2 and the semiconductor active layer 8 as shown in FIG. 16, the radiation detection pixel 20B (hereinafter referred to as a pixel 20B-3) in which the connection line 82 is formed in the middle of the drain electrode 13 to connect the sensor section 103 and the signal line 3 as shown in FIG. 18, and the radiation detection pixel 20B (hereinafter referred to as a pixel 20B-4) in which the drain electrode 13 and the contact hole 17 are electrically cut off while the connection line 82 is formed to connect the sensor section 103 and the signal line 3 as shown in FIG. 21, are specifically compared in terms of a feed-through charges and an line capacitance.

If the capacitances and the voltages of the above are denoted as below,

Cgd: capacitance between gate electrode 2 and drain electrode 13

Vpp: Vgh (voltage of control signal turning on TFT switch 4)–Vgl (voltage of control signal turning off TFT switch 4)

Ca-Si: capacitance of channel portion of TFT switch 4,

Cgs: capacitance between gate electrode 2 and source electrode 9,

Ctft: amount of contribution to capacitance of scan line 101 per TFT switch 4,

Cpd: capacitance of sensor section 103, and

Csd: capacitance between lower electrode 11 and signal lines 3 on both sides of pixel 20 including lower electrode 11, the feed-through charges ΔQ of the radiographic imaging pixels 20B and the pixels 20B-1 to 20B-4 are obtained as follows.

$$\text{pixel } 20A: \Delta Q = Cgd \times Vpp \tag{1}$$

$$\text{pixel } 20B\text{-}1: \Delta Q = (Cgd + Ca\text{-}Si + Cgs) \times Vpp \approx 4Cgd \times Vpp \tag{2}$$

$$\text{pixel } 20B\text{-}2: \Delta Q = 0 \tag{3}$$

$$\text{pixel } 20B\text{-}3: \Delta Q = (Cgd + Cgs) \times Vpp \approx 2Cgd \times Vpp \tag{4}$$

$$\text{pixel } 20B\text{-}4: \Delta Q = Cgd \times Vpp \tag{5}$$

Accordingly, the pixel 20B-4 whose feed-through charges ΔQ is close to that of the radiographic imaging pixel 20B is preferable, and the pixel 20B-3 is more preferable than the pixel 20B-1.

On the other hand, the amounts of contribution to capacitance of scan line 101 per TFT switch 4 Ctft of the radiographic imaging pixels 20A and the pixels 20B-1 to 20B-4 may be obtained as follows.

$$\text{pixel } 20A: Ctft = Cgd + Cgs/(Cpd + Csd) = Cgd + \{Cgs(Cpd + Csd)/(Cgs + Cpd + Csd)\}$$

Where Cgs and Csd may be omitted because of (Cpd≥Cgs) and (Cpd≥Csd), $$\approx Cgd + Cgs \approx 2Cgd \tag{6}$$

$$\text{pixel } 20B\text{-}1: Ctft = Cgd + Ca\text{-}Si + Cgs \approx 4Cgd \tag{7}$$

$$\text{pixel } 20B\text{-}2: Ctft = 0 \tag{8}$$

$$\text{pixel } 20B\text{-}3: Ctft = Cgd + Cgs \approx 2Cgd \tag{9}$$

$$\text{pixel } 20B\text{-}4: Ctft = Cgd \tag{10}$$

Accordingly, in order to suppress the change in line capacitance to be small, the pixel 20B-3 whose capacitance Ctft is close to that of the radiographic imaging pixels 20A is preferable.

Because the feed-through charges has large influence to image quality, a feed-through component of the radiation detection pixels 20B may be matched with that of other pixels by taking the configuration of the pixel 20B-4. Accordingly, a phenomenon in which the offset value varies in the radiation detection pixels 20B can be suppressed. Even in the configuration of the pixel 20B-3, the feed-through capacity may be cut in half compared with the pixel 20B-1.

Figure 20:
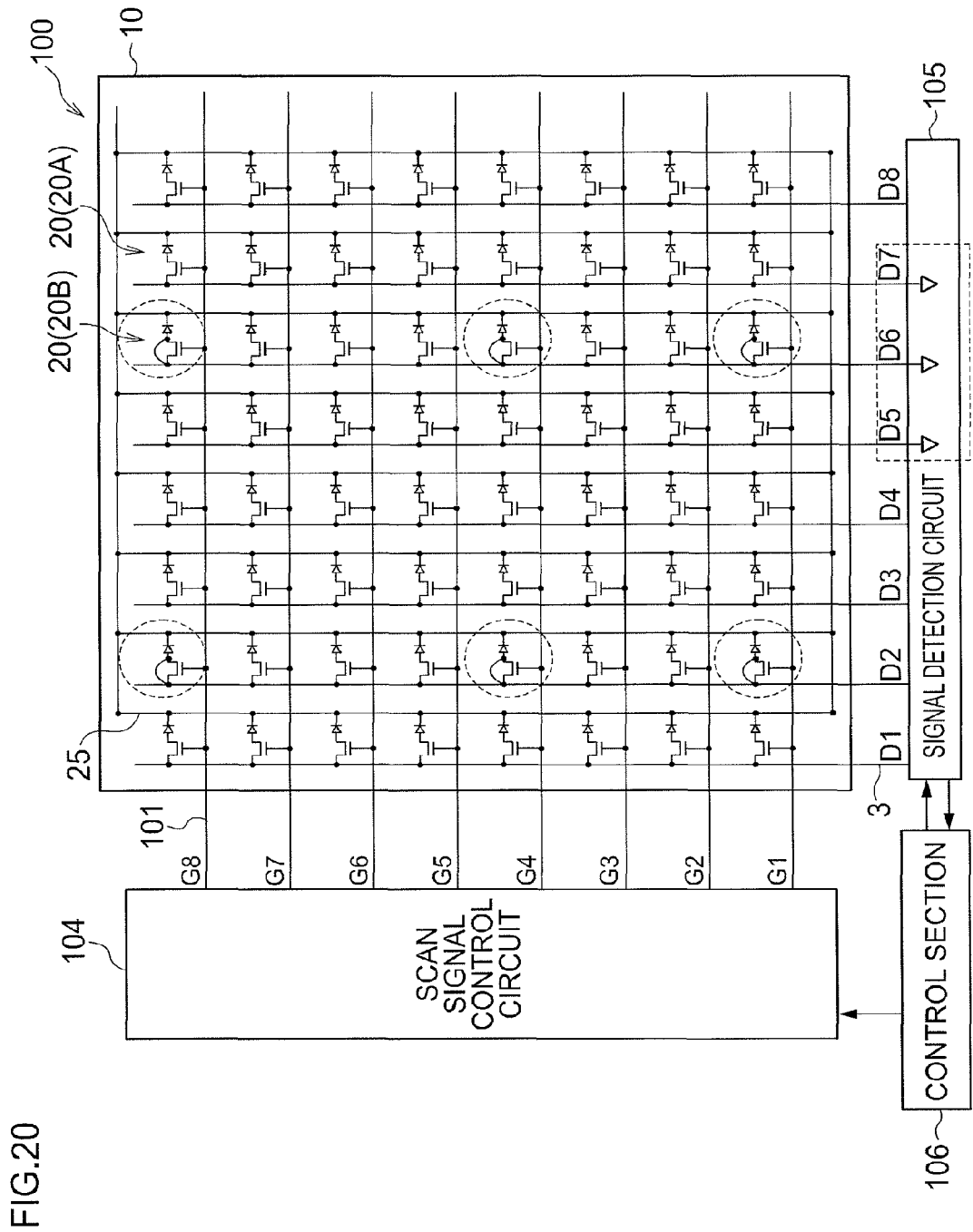
FIG. 20 is a configuration diagram illustrating an entire configuration of a radiation detection element according to an alternative exemplary embodiment of the present invention.

Further, in the fifth exemplary embodiment, sampling, in the predetermined period 1H, is performed to both the electric signals flowing in the signal line D6 connected to the radiation detection pixels 20B, and the electric signals flowing in the signal line D7 that is provided adjacent to the signal line D6 and is not connected to the radiation detection pixels 20B, and the noise is cancelled by subtracting the value of the digital data of the signal line D7 from the value of the digital data of the signal line D6. However, the present invention is not limited to thereto. For example, as shown in FIG. 20, the sampling may be performed to the electric signals flowing in the signal lines 3 D5 and D7 that are provided on both sides of the signal line D6. Then, average of the values of the digital data of the signal lines 3 D5 and D7 may be obtained, and the average may be subtracted from the value of the digital data of the signal line D6. Namely, in an alternative exemplary embodiment, the electric signals flowing in the plural signal lines 3 that are not connected to the radiation detection pixels 20B may be detected to obtain the digital data, the average of the values of the digital data may be obtained from the digital data, and the average may be subtracted from the value of the digital data of the signal line D6 connected to the radiation detection pixels 20B. In the alternative exemplary embodiment, if similar noises are generated in each signal line 3, any signal lines 3 that are not connected to the radiation detection pixels 20B may be used to perform the sampling along with the signal lines 3 connected to the radiation detection pixels 20B. However, if the generated noise varies in the signal lines 3 depending on its position, the signal lines 3 is located near the sampling target signal lines 3 connected to the radiation detection pixels 20B and connected to the same signal detection circuit 105 may be used as the sampling target signal lines 3.

In the fifth exemplary embodiment, the signal lines 3 (for example D6) connected to the radiation detection pixel 20B and the signal lines 3 (for example, D7) that are not connected to the radiation detection pixel 20B are used for sampling. However, the plural radiation detection pixels 20B may be concentrated in the specific signal line D6, and the radiation detection pixels 20B that are fewer than the number of radiation detection pixels 20B connected to the signal line D6 may be connected to the signal line D7.

In the fifth exemplary embodiment, the difference between the electric signals flowing in the signal lines 3 connected to the radiation detection pixel 20B and the electric signals flowing in the signal lines 3 (for example, D7) that is not connected to the radiation detection pixel 20B is obtained. However, the present invention is not limited to thereto. The radiation detection plural pixels 20B may be concentrated in the specific signal lines 3, and the radiation detection pixels 20B may also be connected to the signal lines 3 for noise detection that becomes a comparison reference, when the number of radiation detection pixels 20B connected to the noise detection signal lines 3 that becomes the comparison reference is lower than the number of radiation detection pixels 20B connected to the first signal lines 3. Namely, the difference may be obtained between the electric signals flowing in one signal line 3 connected to the radiation detection pixels 20B and the electric signals flowing in the other signal line 3 connected to the radiation detection pixels 20B that are fewer than the number of radiation detection pixels 20B on the one signal line. For example, the radiation detection pixels 20B that are fewer than the number of pixels on the signal line D6 may be connected to the signal line D7 shown in FIGS. 13, 17, and 20.

Sixth Exemplary Embodiment

A sixth exemplary embodiment of the present invention will be described below.

The configurations of the radiation detection element 10 and the radiographic imaging apparatus 100 of the sixth exemplary embodiment and the operational flow at the time of imaging the radiation image are same to those of the first exemplary embodiment (see FIGS. 1 to 7). Therefore, the descriptions thereof will be omitted.

In the radiographic imaging apparatus 100 in which the radiation is detected using the radiation detection pixels 20B, an amount of electric signals flowing in the signal lines 3 varies depending on a sampling period in which the radiation is detected. Therefore, in order to improve radiation detection performance, lengthening the sampling period (a sampling period 1Hca in the predetermined period 1H) is preferable.

On the other hand, in the case in which the predetermined period 1H is equal to the period (hereinafter referred to as a reset period 1R) in which the reset operation is performed to the one scan line 101, as set forth in the above exemplary embodiments (1H=1R), when N is the number of scan lines 101, a frame period 1F can be obtained as follows.

$$\text{frame period:} 1F = N \times 1R = N \times 1H \quad (11)$$

Therefore, since the predetermined period 1H is lengthened due to the increase of sampling period 1Hca, the frame period 1F is lengthened.

When the irradiation of radiation irradiation is performed during the radiation detection waiting state, namely, when the irradiation of radiation irradiation is performed during the reset operation, the reset operation is performed up to Gn+1th scan line, and thereafter, immediately moves to the accumulation period. Accordingly, an offset step (a step of an offset value) caused by an electric signals due to charges generated by the dark current or the like (so-called offset) may be generated in the read-out data, and the step may be generated in the image. Note that, the offset step depends on the length of the frame period 1F.

Namely, when Ioff_pd denotes a dark current value, the generated offset step can be obtained as follows.

$$\text{offset step:} \le Ioff\_pd \times 1H \times N \quad (12)$$

Accordingly, when the frame period 1F is lengthened with increasing sampling period 1Hca, the offset step may be increased and sometimes may be visibly recognized.

Figure 22:
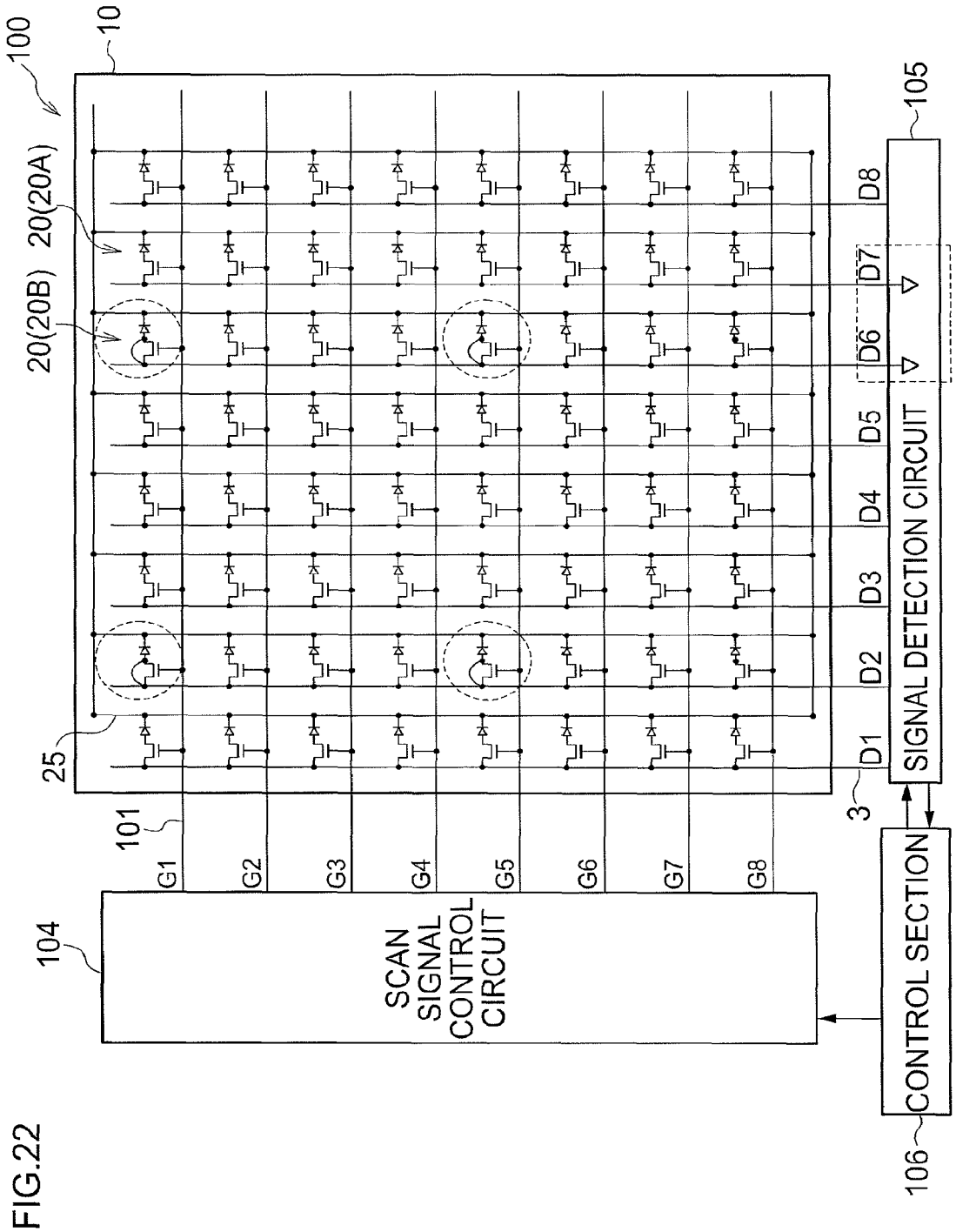
FIG. 22 is a configuration diagram illustrating an entire configuration of a radiation detection element according to a sixth exemplary embodiment of the present invention.

In the sixth exemplary embodiment, the predetermined period 1H in which the signal detection circuit 105 accumulates the electric signals flowing in the signal lines 3 (in FIG. 22, at least one of the signal lines D6 and D7, in this case, the signal line D6) connected to the radiation detection pixels 20B and the electric signals flowing in the signal lines 3 (in FIG. 22, at least one of the signal lines D1, D3 to D5, D7, and D8, in this case, the signal line D7) that is not connected to the radiation detection pixels 20B, is set to the period in which the reset operation is performed to the four scan lines 101, namely, predetermined period 1H=reset period 1R×4. Therefore, the frame period 1F is shortened to suppress the generated offset step.

Figure 23:
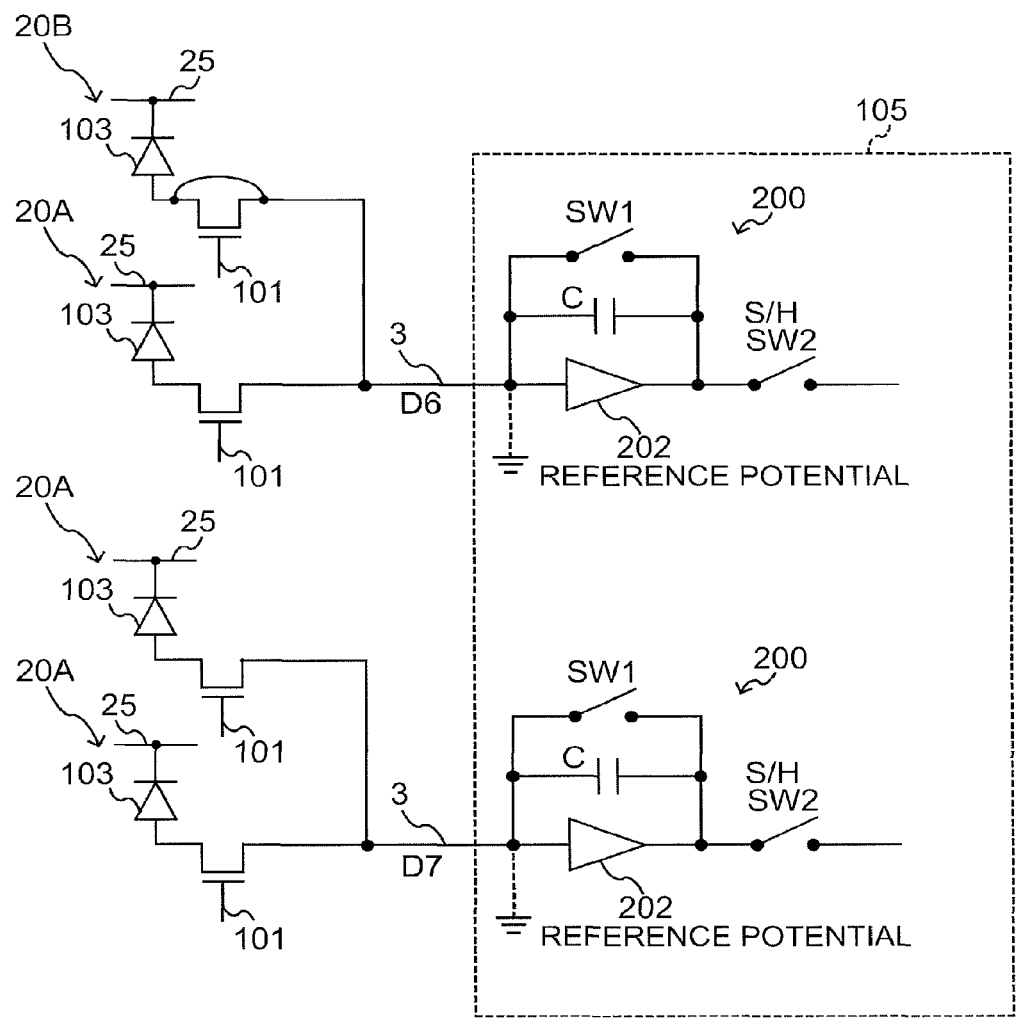
FIG. 23 is an equivalent circuit in focusing on a signal detection circuit of the radiographic imaging apparatus of the sixth exemplary embodiment.

Here, the configuration and the operation for accumulating the electric signals with the signal detection circuit 105 in the sixth exemplary embodiment will be described with reference to FIG. 23. FIG. 23 shows an equivalent circuit in focusing on a signal detection circuit 105 of the radiographic imaging apparatus 100 of the sixth exemplary embodiment. As described above, the signal detection circuit 105 of the radiographic imaging apparatus 100 incorporates an amplifying circuit 200 therein for each signal line 3 to amplify the input electric signals. The amplifying circuit 200 is formed from a charge amplifying circuit, and the amplifying circuit 200 includes an amplifier 202 such as an operational amplifier, a capacitor C connected in parallel with the amplifier 202, and a charge reset switch SW1 connected in parallel with the amplifier 202.

In the amplifying circuit 200, the TFT switches 4 of the pixels 20 read out the charges (the electric signals) when the charge reset switch SW1 is in an OFF state. Then, the capacitors C accumulates the charges read our by the TFT switches 4. Further, a voltage value output from the amplifiers 202 is increased according to the accumulated charge amount. An amplification factor of the amplifying circuit 50 depends on the capacitance of the capacitor C.

The control section 106 controls the ON state and the OFF state of the charge reset switches SW1 by applying a charge reset signal to the charge reset switches SW1 in the predetermined period 1H (in the sixth exemplary embodiment, predetermined period 1H=reset period 1R×4). When the charge reset switches SW1 are set to the ON state, an input side and an output side of the amplifiers 202 are short-circuited to discharge the charges of the capacitors C. Namely, the charges read out by the TFT switches 4 are accumulated in the capacitors C during the predetermined period 1H, and are amplified and output from the amplifying circuits 200 at the end of the predetermined period 1H.

The electric signals from the amplifiers 202 are output to ADC (analog-digital converter, not shown) while a S/H (sample hold) switch SW5 is in the ON state, and the ADC converts the electric signals that is of the analog signal into the digital signal.

Figure 24:
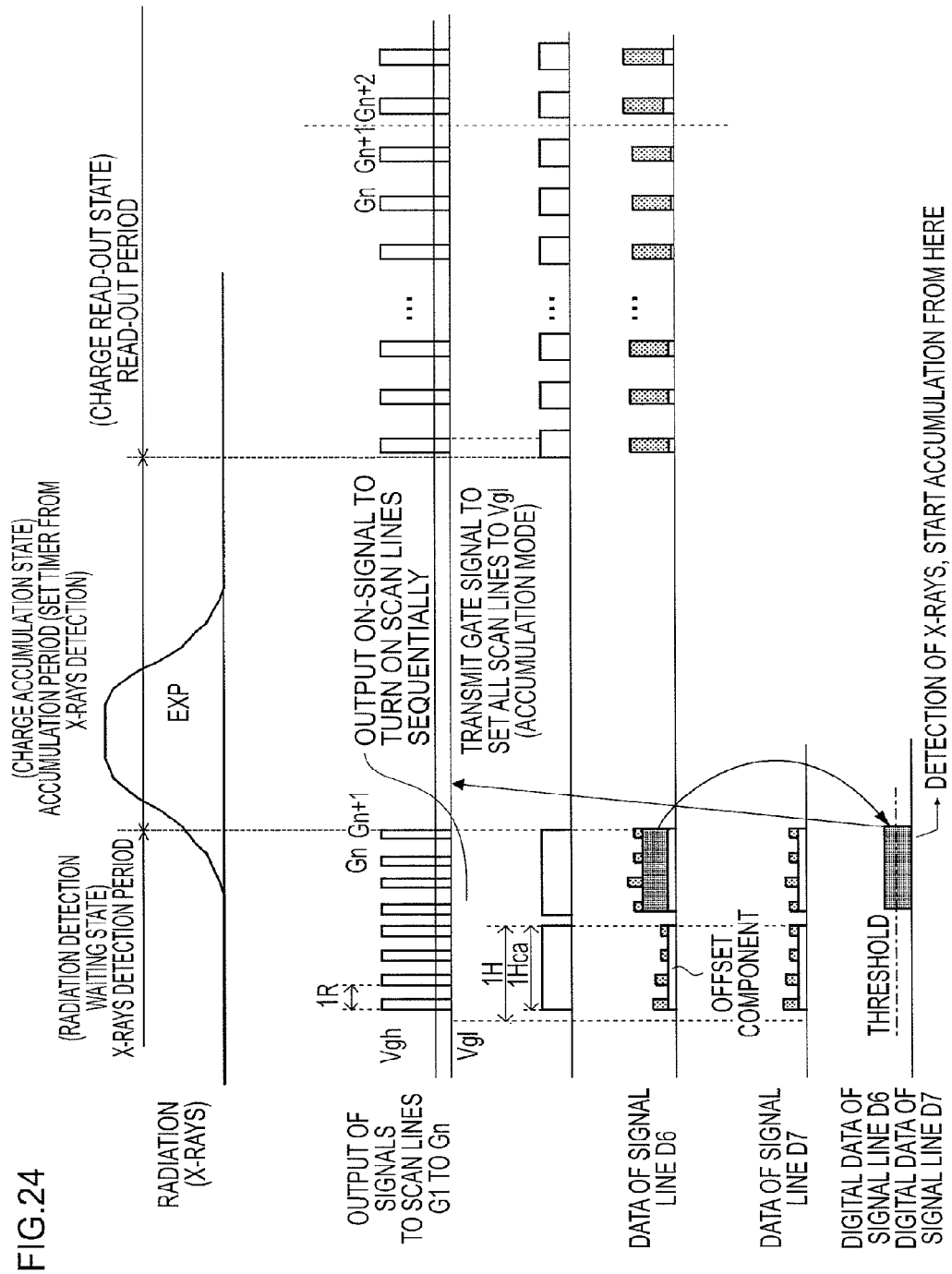
FIG. 24 is a timing chart illustrating the detailed operation flow at the time of imaging a radiation image by the radiographic imaging apparatus of the sixth exemplary embodiment.

FIG. 24 is a timing chart illustrating the detailed operation flow at the time of imaging the radiation image by the radiographic imaging apparatus 100 of the sixth exemplary embodiment.

In the radiographic imaging apparatus 100 of the sixth exemplary embodiment, the reset operation is performed four times in the predetermined period 1H (sampling period 1Hca) in which the scan signal control circuit 104 sequentially outputs the ON signal and the OFF signal to the scan lines 101 and the amplifying circuit 200 of the signal detection circuit 105 accumulates the charges. The control section 106 subtracts the value corresponding to the electric signals of the signal lines 3 (in FIG. 22, for example, the signal line D7) that is not connected to the radiation detection pixel 20B, from the value corresponding to the electric signals of the signal lines 3 (in FIG. 22, for example, the signal line D6) connected to the radiation detection pixel 20B. Then, the control section 106 compares the subtracted value with the predetermined radiation detection threshold, and detects the radiation based on whether the subtracted value becomes the threshold or more.

In the sixth exemplary embodiment, because the scan signal control circuit 104 outputs the control signal for performing the reset operation to the four scan lines 101 in the predetermined period 1H, reset period 1R=predetermined period 1H/4 can be obtained. Accordingly, the frame period 1F can be obtained as follows.

$$\text{frame period: } 1F = N \times 1R = N \times \text{predetermined period } 1H/4 \qquad (13)$$

Therefore, as can be seen when the equations (11) and (13) are compared, the frame period may be set to ¼ in the sixth exemplary embodiment.

According to the sixth exemplary embodiment, the frame period 1F may be shortened while the sampling period 1Hca is lengthened, and the frame period may also be shortened in the whole of radiation detection element 10. Accordingly, the offset step depending on the length of the frame period 1F may be suppressed.

In the sixth exemplary embodiment, the value corresponding to the electric signals of the signal lines 3 that is not connected to the radiation detection pixel 20B is subtracted from the value corresponding to the electric signals of the signal lines 3 that is connected to the radiation detection pixels 20B, and the detection of the irradiation of the radiation is performed by comparing the subtracted value to the predetermined threshold. However, the present invention is not limited thereto. For example, the detection of the irradiation of the radiation may be performed by comparing the value corresponding to the electric signals of the signal lines 3 connected to the radiation detection pixels 20B with the predetermined threshold. Note that, in the sixth exemplary embodiment, the reset operation is performed to the four scan lines 101 during the predetermined period 1H. However the present invention is not limited thereto. The reset operation may be performed to any number of scan lines 101 during the predetermined period 1H.

Seventh Exemplary Embodiment

A seventh exemplary embodiment of the present invention will be described below.

The configurations of the radiation detection element 10 and the radiographic imaging apparatus 100 of the seventh exemplary embodiment and the operational flow at the time of imaging the radiation image are same to those of the first exemplary embodiment (see FIGS. 1 to 7). Therefore, the descriptions thereof will be omitted.

In the case in which the reset operation is performed to the scan line 101 connected to the radiation detection pixels 20B as the fifth exemplary embodiment, because the capacitance of the TFT switches 4 are larger than that of the radiographic imaging pixels 20A, when the radiographic imaging pixel 20A is not irradiated with the radiation, the signal value corresponding to the charges (the electric signals) output from the radiation detection pixels 20B becomes larger than the signal value output from the radiographic imaging pixels 20A. On the other hand, when the radiographic imaging pixel 20A is irradiated with the radiation, because the charges generated according to the irradiated radiation immediately flows in the signal lines 3, generally the signal value corresponding to the charge amount (the electric signals) output from the radiation detection pixels 20B tends to become smaller than the signal value output from the radiographic imaging pixels 20A. The signal value corresponding to the charges (the electric signals) output from the radiation detection pixels 20B also varies by driving timing of the pixels 20 and the signal level.

In the radiation detection pixels 20B, since the signal values are instable as set forth in the fifth exemplary embodiment, degrade of accuracy in detecting the irradiation of radiation may occur, when the detection is performed based on the differential value with the adjacent signal lines 3 (the signal lines 3 that is not connected to the radiation detection pixels 20B).

Therefore, in the seventh exemplary embodiment, the control section 106 performs the control such that the sampling period Hca in the predetermined period 1H does not include the reset operation of the radiation detection pixels 20B. Namely, the control section 106 performs the reset operation by turning ON the scan lines 101 that are connected to the radiation detection pixels 20B whose signal value is instable, and controls the signal detection circuit 105 such that the read out charges are not accumulated in the amplifying circuit 200.

Figure 25:
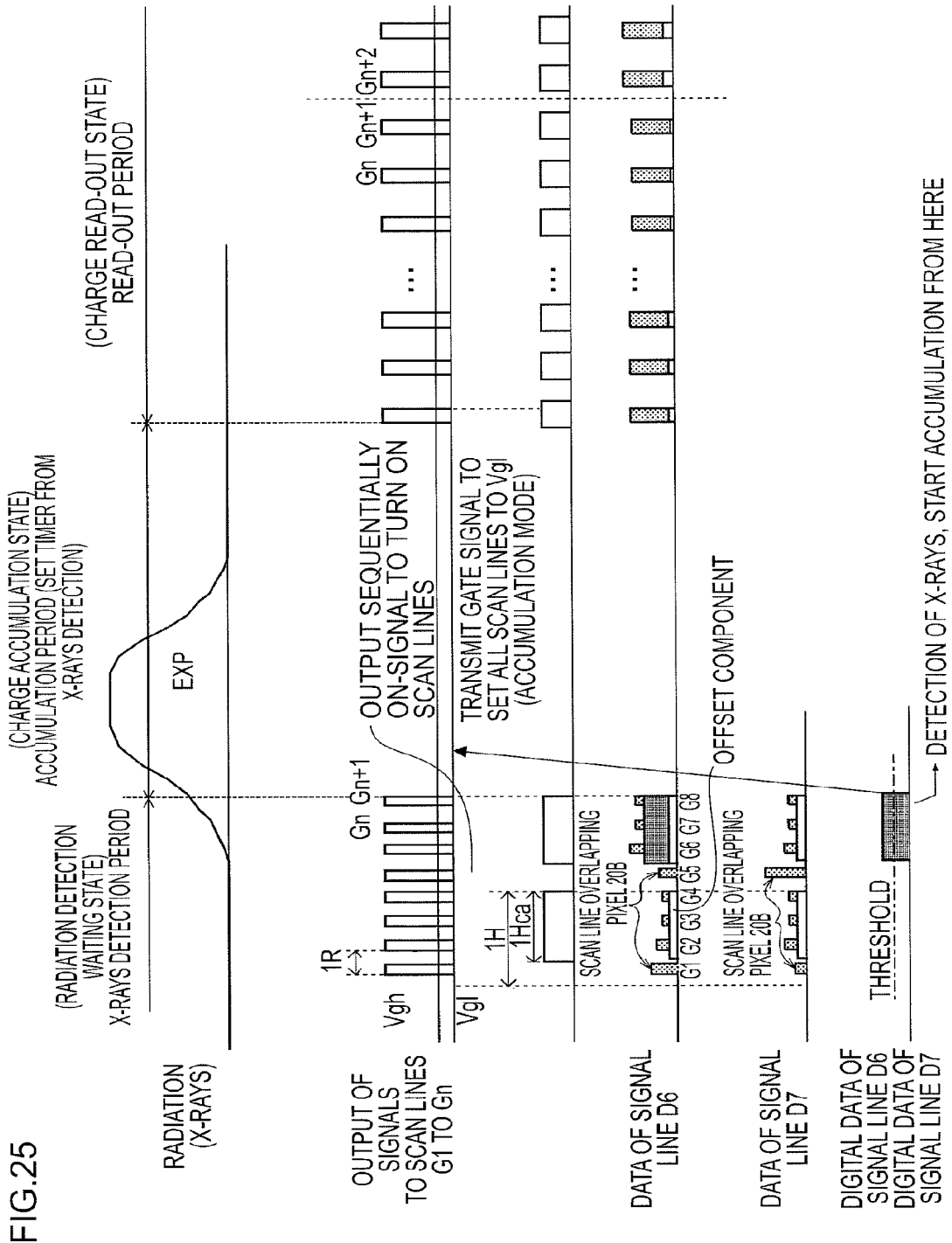
FIG. 25 is a timing chart illustrating the detailed operation flow at the time of imaging a radiation image by the radiographic imaging apparatus according to a seventh exemplary embodiment of the present invention.

FIG. 25 is a timing chart illustrating the detailed operation flow at the time of imaging the radiation image by the radiographic imaging apparatus 100 of the seventh exemplary embodiment.

FIG. 25, shows that the data of the signal line D6 of the scan line 101 (G1 and G5) connected to the radiation detection pixels 20B largely differ from the data of the signal line D7 that is not connected to the radiation detection pixel 20B. As described above, this shows that the data of the scan line 101 (G1 and G5) connected to the radiation detection pixels 20B are instable.

The radiographic imaging apparatus 100 of the seventh exemplary embodiment is equal in its operation to the fifth exemplary embodiment in the predetermined period 1H. However, in the seventh exemplary embodiment, the sampling period Hca which is the accumulation period where charges are accumulated in the amplifying circuit 200, is omitted by the amount of reset period 1R of the scan line 101 (in FIGS. 23 and 25, G1 and G5) that is connected to the radiation detection pixel 20B.

Accordingly, in the seventh exemplary embodiment, the sampling period Hca is determined so as to omit the period of the reset operation of the scan line 101 that is connected to the radiation detection pixel 20B. Therefore, the signal value corresponding to the electric signals of the signal lines 3 that is connected to the radiation detection pixel 20B may be stabilized when performing the detection of the irradiation of radiation.

Accordingly, even if the noise is generated in each signal line 3, the noise component or the offset component may be cancelled to improve the accuracy of detection when performing the detection of the irradiation of radiation. Further, since there is no need to enhance the radiation detection threshold, the start of the radiation irradiation may be detected earlier.

In the sixth and seventh exemplary embodiments, predetermined period 1H=reset period 1R×4 was determined since the radiation detection pixels 20B are provided in each three scan lines 101 (one in four). Alternatively, the predetermined period 1H may be set in another way as long as the predetermined period 1H is fixed according to the period in which the radiation detection pixel 20B is provided (the period in which the scan line 101 is connected). Since the control is performed such that the predetermined period 1H is fixed according to the period in which the radiation detection pixel 20B is provided, the radiation detection pixels 20B is not randomly provided in the scan line 101, but preferably the radiation detection pixels 20B are provided at contact intervals.

In the first to seventh exemplary embodiments, the radiographic imaging pixels 20A and the radiation detection pixels 20B are provided as the pixels 20 in the radiation detection element 10. However, for example, a pixel adapted to another use may be provided.

Note that the detection of the end of the irradiation of radiation, described in the fourth exemplary embodiment, may be combined with the detection of the start of the irradiation of radiation in the second, third, and fifth exemplary embodiments.

The noise canceling, described in the fifth exemplary embodiment, may be combined with the detection of the start of the irradiation of radiation in the second to fourth exemplary embodiments.

In the fourth exemplary embodiment, a case in which the signal detection circuit 105 repeatedly performs the sampling, in which the electric signals flowing in the signal lines 3 connected to the radiation detection pixels 20B is converted into the digital data to detect the radiation, to detect the end of the irradiation of radiation in the predetermined period 1H even after the irradiation of radiation is detected. However, the present invention is not limited thereto. For example, the digital data detected in each sampling may be integrated to detect a total amount of irradiated radiation. By detecting the total amount of irradiated radiation, the radiation detection element 10 may be used as an AEC sensor.

Further, in the above exemplary embodiment, a case where the present invention is applied to the radiation detecting element 10 of the indirect conversion system has been described. However, the present invention may also be applied to a radiation detecting element of the direct conversion system that directly converts radiation into charges and accumulates the charges in a semiconductor layer.

Further, in the above exemplary embodiment, a case where the present invention is applied to the radiographic imaging device 100 that detects an image by detecting X-rays has been described. However the present invention is not limited thereto. For example, the radiation serving as the detection target may be any of X-rays, visible light, ultraviolet rays, infrared rays, gamma rays, particle rays, etc.

In addition, the configuration of the radiographic imaging device 100 and the configuration of the radiation detecting element 10 that have been described in the above exemplary embodiment are examples and, it goes without saying, are appropriately alterable in a scope that does not depart from the gist of the present invention.

What is claimed is:

1. A radiation detection element, comprising:
a plurality of scan lines that are provided in parallel to each other;
a plurality of signal lines that are provided in parallel to each other, and that intersect with the scan lines; and
a plurality of pixels that are provided in a matrix form at intersecting portions of the scan lines and the signal lines, the plurality of pixels including:
a plurality of radiographic imaging pixels each including a sensor section that generates charges based on irradiation of radiation or on illumination of light that has been converted from radiation, and a switching element that is turned ON and OFF according to a state of a control signal flowing in the scan line, wherein the sensor section is electrically connected to the signal line through the switching element, and electric signals corresponding to the charges generated in the sensor section flow in the signal line according to the state of the control signal, and
a plurality of radiation detection pixels each including the sensor section, which is electrically connected to the signal line, wherein electric signals corresponding to the charges generated in the sensor section flow in the signal line irrespective of the state of the control signal,
wherein the plurality of radiographic imaging pixels and the plurality of radiation detection pixels are connected to the same specified signal line.

2. The radiation detection element of claim 1, wherein the radiation detection element includes a plurality of specified signal lines to which the plurality of radiographic imaging pixels and the plurality of radiation detection pixels are connected.

3. The radiation detection element of claim 1, wherein signal lines to which the plurality of radiographic imaging pixels are connected are provided adjacent to the specified signal line to which the plurality of radiographic imaging pixels and the plurality of radiation detection pixels are connected.

4. The radiation detection element of claim 1, wherein the ratio of the plurality of radiation detection pixels with respect to the plurality of pixels is from 0.01% to 1%.

5. The radiation detection element of claim 1, wherein the radiation detection pixel further includes:
a connection line that connects the sensor section and the signal line; and
a switching element that is substantially identical to the switching element included in the radiographic imaging pixel,
wherein the sensor section is electrically connected to the signal line through the switching element of the radiation detection pixel.

6. The radiation detection element of claim 5, wherein the switching element of the radiation detection pixel is electrically separated from the sensor section.

7. The radiation detection element of claim 1, wherein the radiation detection pixel further includes a short-circuited switching element, wherein the sensor section is electrically connected to the signal line through the short-circuited switching element.

8. The radiation detection element of claim 1, wherein the plurality of radiation detection pixels are provided at intervals of at least one pixel, and are provided at only some signal lines out of the plurality of signal lines.

9. A radiographic imaging apparatus comprising:
the radiation detection element of claim 1;
a control signal output section that outputs the control signal to the plurality of scan lines;
an AD conversion section that converts the electric signals flowing in the plurality of signal lines to digital data;
a generation section that generates image information expressing a radiation image based on the digital data by interpolating the image information of the radiation detection pixels; and
a detection section that detects, at least one of a start of irradiation of radiation, an end of irradiation of radiation, and an amount of irradiated radiation, on the basis of the digital data that has been converted by the AD conversion section from the electric signals that flow in the signal lines out from the radiation detection pixels.

10. The radiographic imaging apparatus of claim 9, wherein the detection section detects the start of irradiation of radiation, and the detection section further includes:
a control section which, during standby, controls the control signal output section so as to repeatedly perform a reset operation, which outputs control signals for reading out the charges to the plurality of scan lines to extract the charges from the radiographic imaging pixels, and, at the time of imaging a radiographic image, when the start of irradiation of radiation has been detected by the detection section, controls the control signal output section to output control signals that prohibit extraction of the charges to the plurality of scan lines and, after the end of irradiation of radiation, output control signals that perform extraction of the charges to the plurality of scan lines.

11. The radiographic imaging apparatus of claim 10, wherein the control section controls the control signal output section to repeatedly perform the reset operation until the start of irradiation of radiation is detected by the detection section at the time of imaging a radiographic image.

12. The radiographic imaging apparatus of claim 10, wherein the control section controls the control signal output section to output control signals that prohibit extraction of the charges with respect to the plurality of scan lines, until the detection section detects the start of irradiation of radiation, at the time of imaging the radiation image.

13. The radiographic imaging apparatus of claim 10, wherein the control signal output section outputs control signals for extracting the charges sequentially to the plurality of scan lines, or at once to all of the plurality of scan lines, during the reset operation.

14. The radiographic imaging apparatus of claim 9, wherein the AD conversion section converts the electric signals flowing in the signal lines into the digital data within a period shorter than a radiation irradiation period for imaging the radiation image, and
wherein the detection section detects, at least one of the start of irradiation of radiation, the end of irradiation of radiation, and the amount of irradiated radiation, within the period.

15. The radiographic imaging apparatus of claim 9, wherein the AD conversion section converts, into the digital data, the electric signals flowing in one of the signal lines connected to the radiation detection pixels, and the electric signals flowing in the signal lines that are not connected to the radiation detection pixels or in the signal lines connected to a smaller number of radiation detection pixels than the one of the signal lines, and
wherein the detection section performs the detection based on a difference between a value of the digital data of the one of the signal lines connected to the radiation detection pixels, and a value of the digital data of the signal lines that are not connected to the radiation detection pixels or of the signal lines connected to a smaller number of radiation detection pixels than the one of the signal lines.

16. The radiographic imaging apparatus of claim 15, wherein a plurality of the AD conversion sections are provided, each connected to a predetermined number of the plurality of signal lines, and
wherein the detection section performs the detection based on a difference between the value of the digital data of the one of the signal line connected to the radiation detection pixel, and the value of the digital data of the signal lines that are not connected to the radiation detection pixels or of the signal lines connected to a smaller number of radiation detection pixels than the one of the signal lines, said values being the values of digital data into which the electric signals are converted by the same AD conversion section.

17. The radiographic imaging apparatus of claim 15, wherein the detection section performs the detection based on a difference between a value of the digital data of the signal line connected to one of the radiation detection pixels, and a value of the digital data of the signal line that is adjacent to the signal line connected to the one of the radiation detection pixels and not connected to the radiation detection pixel or connected to a smaller number of radiation detection pixels than the one of the signal lines.

18. A radiographic imaging apparatus comprising:
the radiation detection element of claim 1;
a control signal output section that outputs the control signal to the plurality of scan lines;
an amplifier section that accumulates the electric signals flowing in the plurality of signal lines, and that amplifies and outputs the accumulated electric signals;
a detection section that detects at least one of a start of irradiation of radiation, an end of irradiation of radiation, and an amount of irradiated radiation, on the basis of the electric signals output from the amplifier section; and
a control section that controls the control signal output section so as to repeatedly perform a reset operation in a predetermined period, which sequentially outputs a control signal for extracting the charges to the plurality of scan lines to extract the charges from the plurality of pixels.

19. The radiographic imaging apparatus of claim 18, wherein, in the predetermined period, the control section controls the control signal output section to output the control signal for extracting the charges from the radiographic imaging pixels to the scan lines that are not connected to the radiation detection pixels, in order to supply the control signal to the radiation detection pixels.

20. The radiographic imaging apparatus of claim 18, wherein the control section controls the control signal output section to output the control signal for extracting the charges from the radiation detection pixels, to the scan lines outside of the predetermined period.

21. The radiographic imaging apparatus of claim 18, wherein, in each of the predetermined period, the amplifier section accumulates the electric signals flowing in one of the signal lines connected to the radiation detection pixels, and the electric signals flowing in the signal lines that are not connected to the radiation detection pixels or in the signal line connected to a smaller number of radiation detection pixels than the one of the signal lines, and amplifies and outputs the electric signals, and wherein the detection section performs the detection based on a difference between the value of the electric signals, outputted from the amplifier section, of the one of the signal line connected to the radiation detection pixels, and the value of the electric signals, outputted from the amplifier section, of the signal lines that are not connected to the radiation detection pixels or that are connected to a smaller number of radiation detection pixels than the one of the signal lines.

* * * * *